United States Patent
Koga et al.

(10) Patent No.: US 6,331,214 B1
(45) Date of Patent: Dec. 18, 2001

(54) MONOLITHICALLY BONDED CONSTRUCT OF RARE-EARTH MAGNET AND METAL MATERIAL AND METHOD FOR BONDING SAME

(75) Inventors: Masaki Koga, Yokohama; Nobutaka Suzuki; Hitoshi Saitoh, both of Tokyo; Kenshiro Oyamada, Chiba; Koki Tokuhara; Shuji Mino, both of Hyogo; Naoyuki Ishigaki, Shiga; Hitoshi Yamamoto, Chiba, all of (JP)

(73) Assignees: Kabushiki Kaisha Meidensha, Tokyo; Sumitomo Special Metals Co., LTD, Osaka, both of (JP)

( * ) Notice: Subject to any disclaimer, the term of this patent is extended or adjusted under 35 U.S.C. 154(b) by 0 days.

(21) Appl. No.: 09/155,094

(22) PCT Filed: Jan. 20, 1998

(86) PCT No.: PCT/JP98/00198
§ 371 Date: Nov. 20, 1998
§ 102(e) Date: Nov. 20, 1998

(87) PCT Pub. No.: WO98/31497
PCT Pub. Date: Jul. 23, 1998

(30) Foreign Application Priority Data

Jan. 20, 1997 (JP) .................................................... 9-007152

(51) Int. Cl.$^7$ .................................................... H01F 1/053
(52) U.S. Cl. ................ 148/101; 428/555; 428/611; 428/660; 428/678; 428/680; 428/681; 428/685; 428/928; 228/193; 228/194; 228/234.1; 228/235.1; 228/262.7; 228/262.71
(58) Field of Search .................................. 148/101, 102, 148/100; 228/193, 194, 195, 234.1, 235.1, 262.7, 262.71; 428/553, 555, 611, 928, 678, 661, 660, 685, 680, 681, 684

(56) References Cited

U.S. PATENT DOCUMENTS 4,151,435 * 4/1979 Jandeska et al. .
4,617,726 * 10/1986 Denk .......................................... 29/598
4,628,809 * 12/1986 Das et al. .

FOREIGN PATENT DOCUMENTS

| 61-135443 | * 6/1986 | (JP) . |
| 1-171215 | 7/1989 | (JP) . |
| 7-116866 | 5/1995 | (JP) . |
| 7-232284 | 9/1995 | (JP) . |
| 8-116633 | 5/1996 | (JP) . |

OTHER PUBLICATIONS

The American Heritage Dictionary of the English Language, p. 734.*

* cited by examiner

Primary Examiner—John Sheehan
(74) Attorney, Agent, or Firm—Foley & Lardner

(57) ABSTRACT

Its basic means is a monolithically bonded construct prepared by monolithically bonding together a rare-earth magnet 2 and a an alloy material that is a high melting point metal or a high specific-tenacity material through the solid phase diffusion bonding by the hot isostatic pressing treatment, and a monolithically bonded construct with an interposal of a thin layer of the high melting point metal between a rare-earth magnet 2 and an alloy material 3, 4 that is a high specific-tenacity material. As a method for the bonding, there is used a hot isostatic pressing treatment method in which a rare-earth An magnet and a high melting-point metal are laminated together, thereby to prepare an object to be treated, then the object is put into a hermetic-type high pressure container having an inner wall portion equipped with a heater, then the object is uniformly pressurized in all directions by a synergistic effect caused by pressure and temperature, while the object is maintained for a certain period of time under a certain pressure and temperature condition in an atmosphere of an inert gas, thereby to monolithically bond the object. With this, it is possible to obtain a bonded construct in which a magnet can monolithically be bonded with another metal member with a high strength, without deteriorating magnetic characteristics, such that the rare-earth magnet's insufficiency in brittleness, rigidity, tenacity and the like is compensated.

20 Claims, 31 Drawing Sheets

1...Shaft
2...Rare-earth magnet
3...Metal cylinder
4...Metal disk
7...Intermediate member 1...Shaft
2...Rare-earth magnet
3...Metal cylinder
4...Metal disk
7...Intermediate member 9 ··· Non-magnetic disk 5 ··· Iron core
6 ··· Iron core groove portion 10...Lower lid
11...Supporting base
12...Heater
13...Insulating layer
14...Upper lid
15...High pressure cylinder
20...Object to be treated

Fig. 6

Results of Measurement of Demagnetizing Characteristics of Magnet

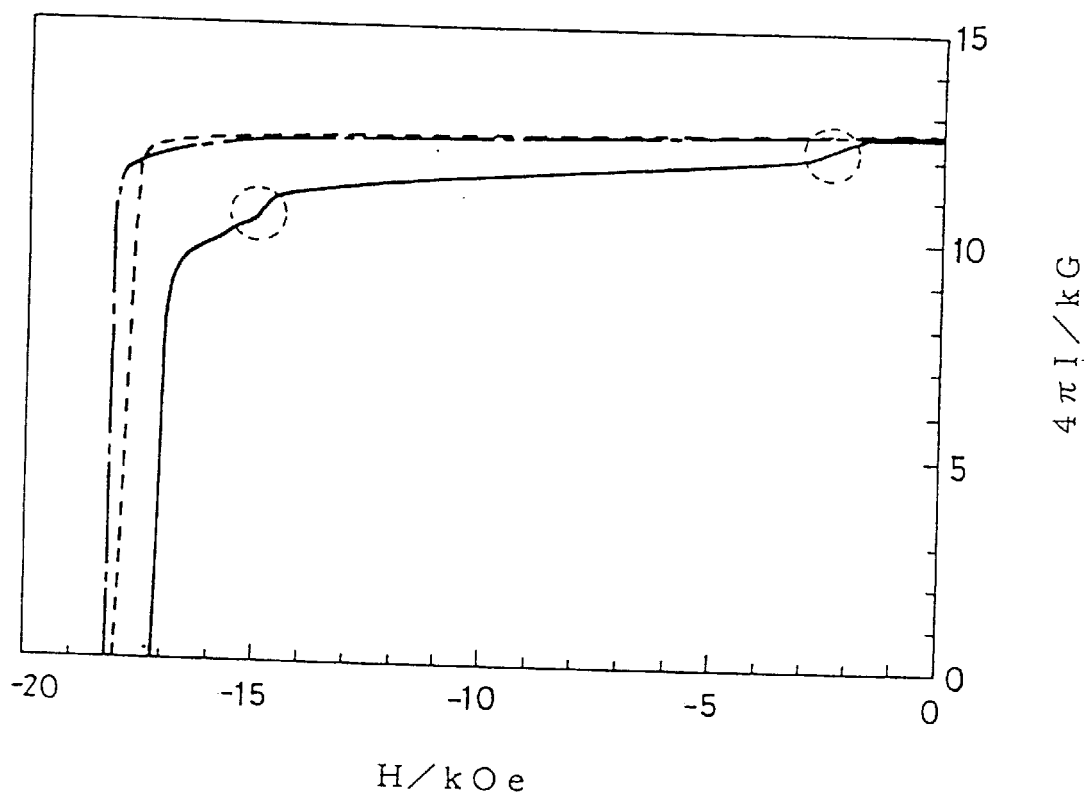

H/kOe

- - - - - A case in which a Mo thin sheet was used as the intermediate member (Example 2)
——— A case in which HIP treatment was conducted without the intermediate member (Comparative Example 1)
— - — A case in which HIP treatment is not conducted, and the intermediate member is not used (Conventional Example)

[Note] Metal as an object to be bonded: titanium alloy (SAT64)

Secondary electron image of the bonded portion (About 800 magnifications) 20 μm

Characteristic X-rays image (Nd)

25 (White-color portion: Nd)

Characteristic X-rays image (Fe)

26 (White-color portion: Fe)

Characteristic X-rays image (B)

27 (White-color portion: B)

Characteristic X-rays image (Ti) Fig. 11
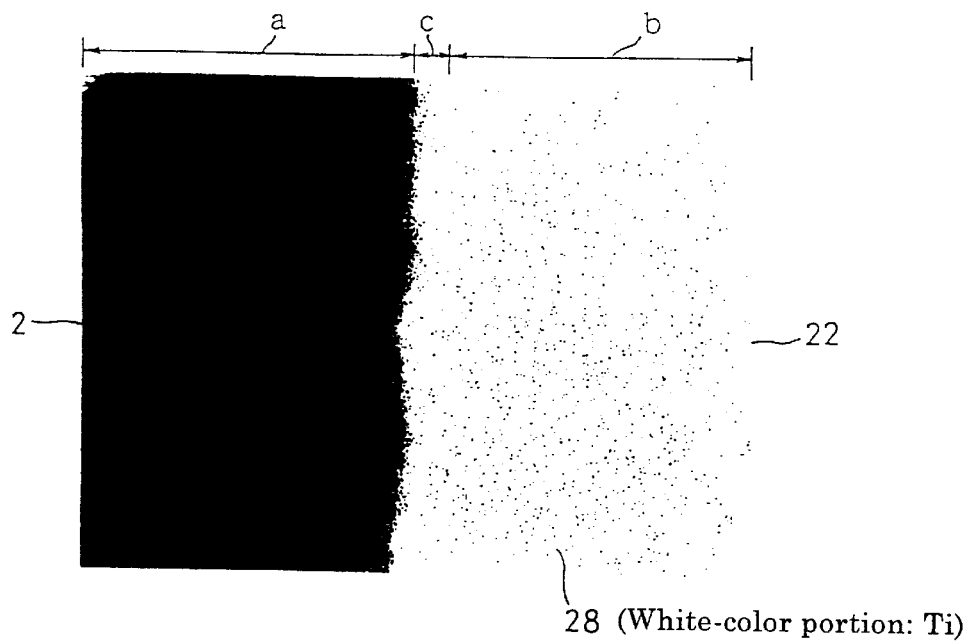
28 (White-color portion: Ti)
Characteristic X-rays image (Al) Fig. 12
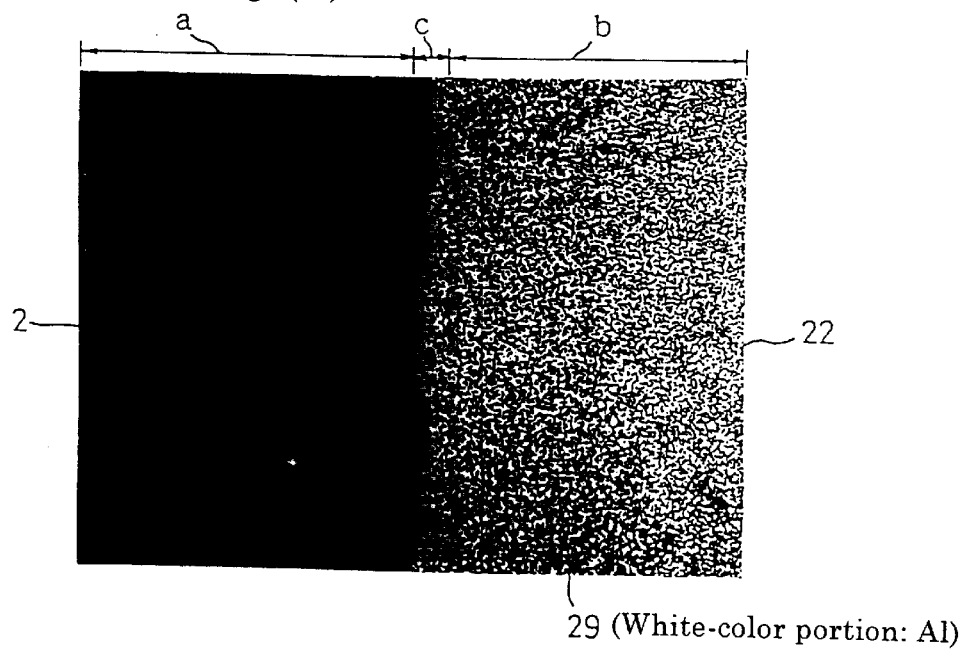
29 (White-color portion: Al)

Secondary electron image of the bonded portion (Ta) Fig.14
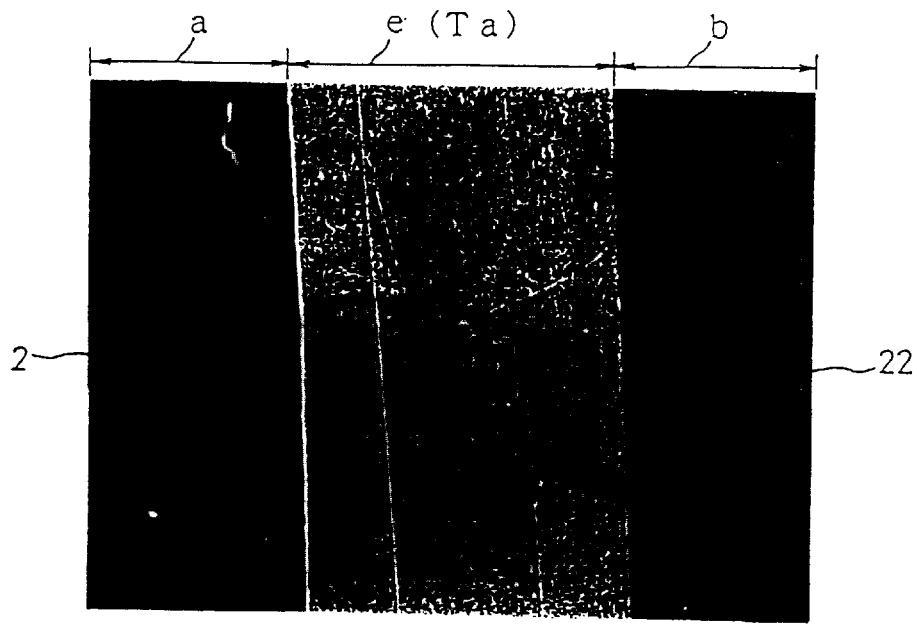
Characteristic X-rays image (Nd) Fig.15
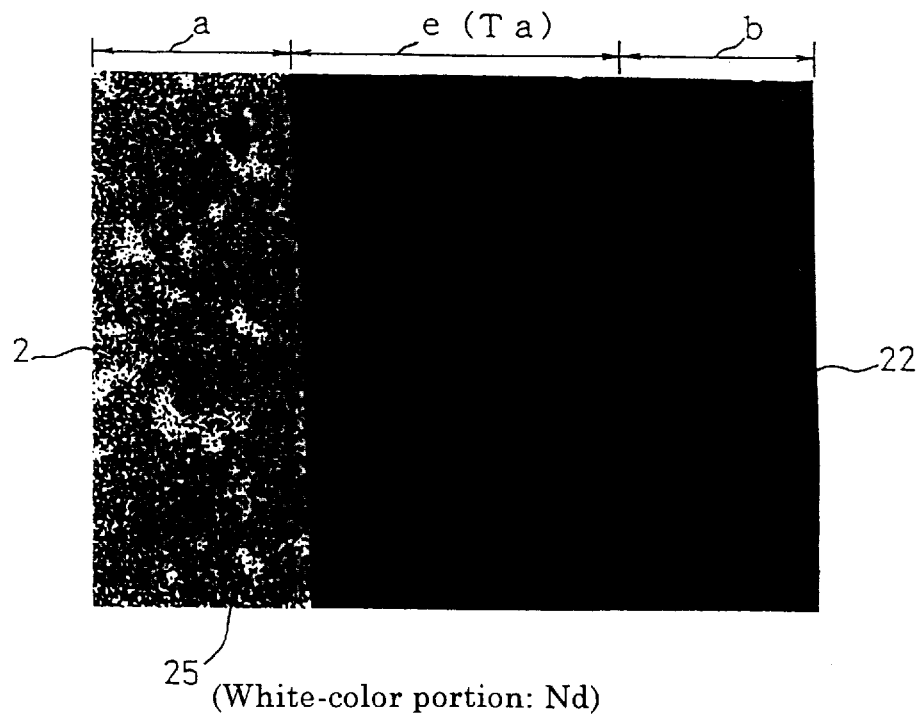
(White-color portion: Nd)

Characteristic X-rays image (Fe)

26 (White-color portion: Fe)

Characteristic X-rays image (B)

27 (White-color portion: B)

Characteristic X-rays image (Ta)

(White-color portion: Ta)

Characteristic X-rays image (Ti)

(White-color portion: Ti)

Characteristic X-rays image (Al)

29
(White-color portion: Al)

Characteristic X-rays image (V)

30
(White-color portion: V)

Secondary electron image of the bonded portion (Mo)

Characteristic X-rays image (Nd)

Characteristic X-rays image (Fe) Fig. 24
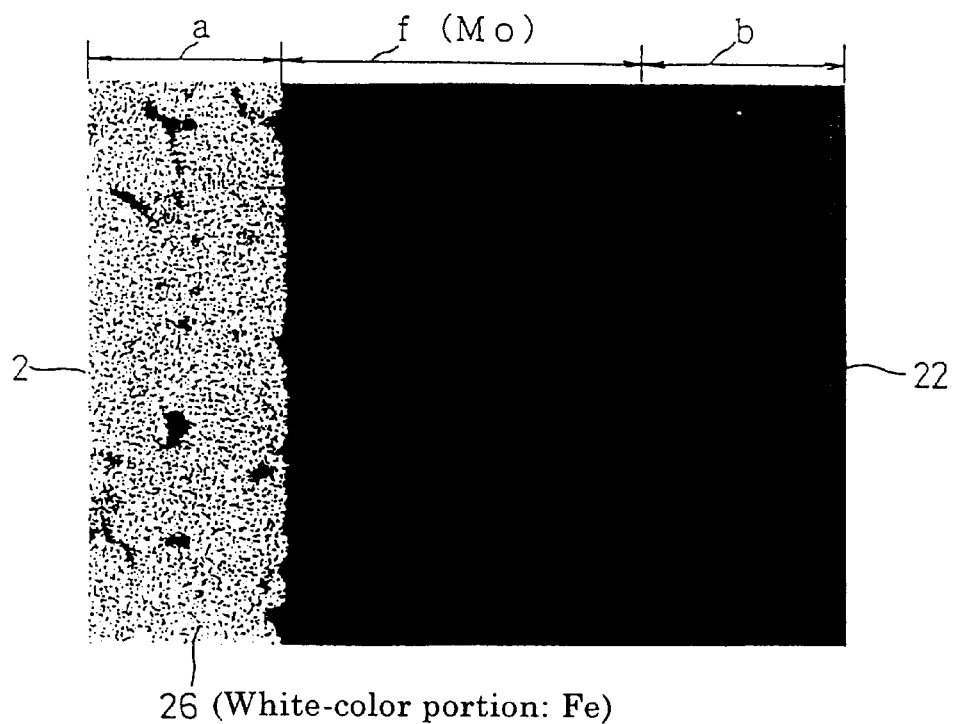
26 (White-color portion: Fe)
Characteristic X-rays image (B) Fig. 25
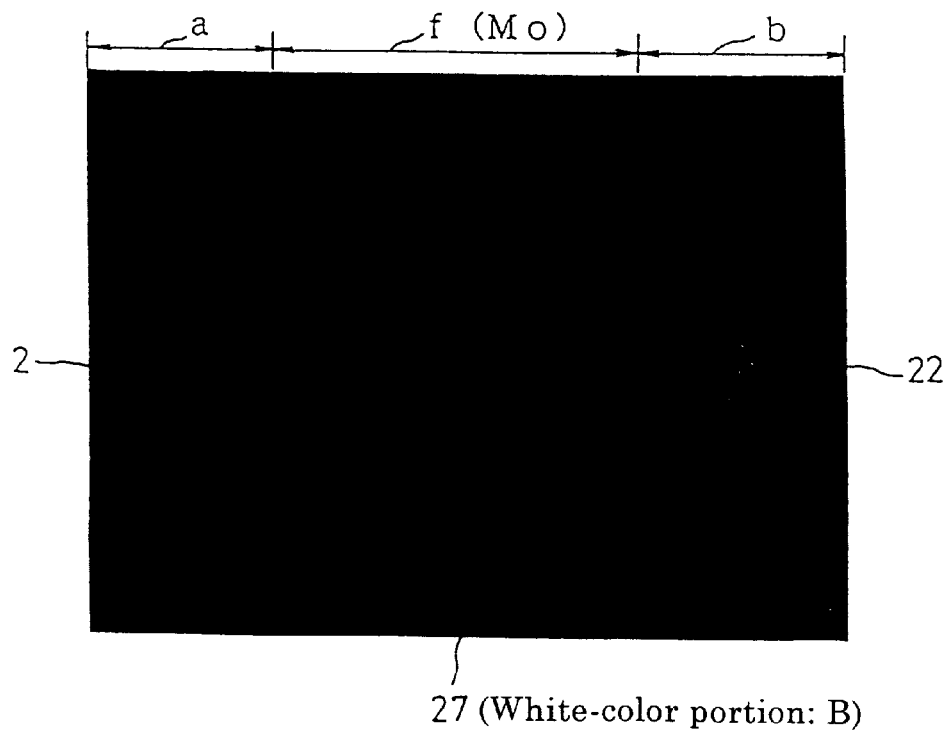
27 (White-color portion: B)

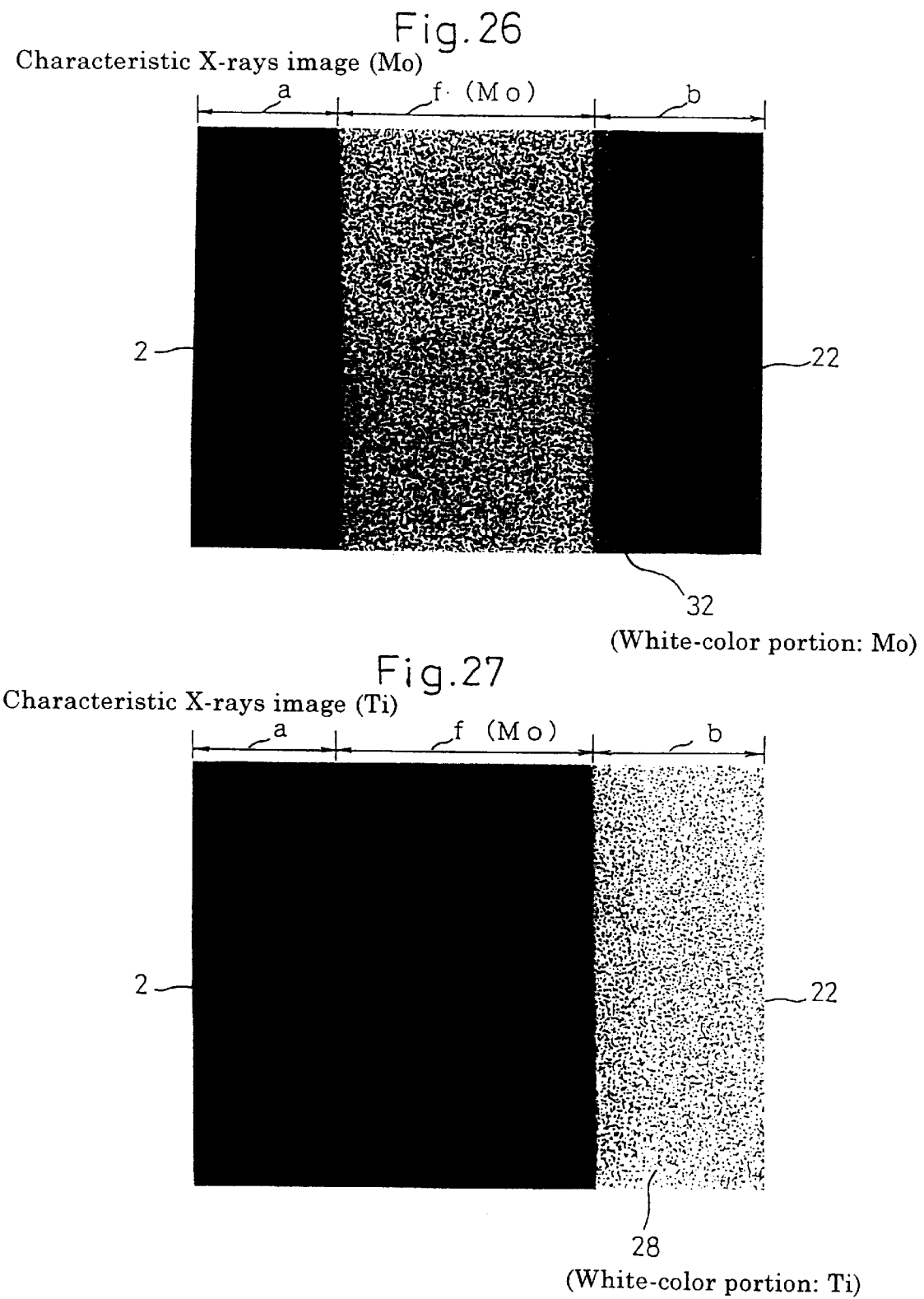

Characteristic X-rays image (Al)
(White-color portion: Al)

Characteristic X-rays image (V)
(White-color portion: V)

Secondary electron image of the bonded portion (W)

Characteristic X-rays image (Nd)

25 (White-color portion: Nd)

Characteristic X-rays image (Fe)

26 (White-color portion: Fe)

Characteristic X-rays image (B)

27 (White-color portion: B)

Characteristic X-rays image (W)

33 (White-color portion: W)

Characteristic X-rays image (Ti)

28
(White-color portion: Ti)

Characteristic X-rays image (Al)

(White-color portion: Al)

Characteristic X-rays image (V)

(White-color portion: V)

Fig.39 Example (2)

Shear Strength in Case that Rare-earth Magnet and Various Alloy Materials Are Directly Bonded Together Shear Strength of Rare-earth Magnet and Various Alloy Materials in Case that Intermediate Member (Ta) Was Interposed

| Alloy Material | Titanium Alloy (SAT64) | Titanium Alloy (SP700) | Titanium Alloy (SP700) | Inconel (MA718) |
|---|---|---|---|---|
| HIP Bonding Temp. | 900℃ | 850℃ | 700℃ | 900℃ |

Shear Strength of Rare-earth Magnet and Various Alloy Materials in Case that Intermediate Member (Mo) Was Interposed

| Alloy Material | Titanium Alloy (SAT64) | Titanium Alloy (SP700) | Titanium Alloy (SP700) | Inconel (MA718) |
|---|---|---|---|---|
| HIP Bonding Temp. | 900°C | 850°C | 700°C | 900°C | ical Field

The present invention relates to monolithically bonded constructs of various rare-earth magnets and metal materials and methods for bonding the same.

BACKGROUND TECHNIQUE

Conventionally known magnets containing rare-earth elements (hereinafter referred to rare-earth magnets) are generally brittle and inferior in strength against tension, bending, torsion and the like and in machinability. Furthermore, there is a problem that it is difficult to increase bonding strength between these rare-earth magnets and metals of rotor member such as electric motor and the like. For example, an example of a schematic structure of a rotor used in a permanent magnet type high-speed electric generator, motor or the like, in which a rare-earth magnet is used, will be explained, by reference to FIGS. 46a and 46b. In these drawings, 1, 2, 3 and 4, 4 are a shaft, a rare-earth magnet, a metal cylinder of non-magnetic material, and a metal disk of non-magnetic material, respectively.

The above rare-earth magnet 2 is a magnet of high magnetic energy product, containing as a main component an active rare-earth element, such as an Nd—Fe—B magnet, in which neodymium is used, a Pr—Fe—B magnet, in which praseodymium is used, and a Sm—Co magnet, in which samarium is used. This rare-earth magnet 2 tends to corrode. Therefore, it is provided with an epoxy coating, an aluminum-chromate film or a nickel plating with copper bed. In its bonding with a rotor member metal of a metal cylinder 3 or the like, a means for bonding using a polymer bond such epoxy resin is taken.

In case of the above-mentioned rotor structure, the rare-earth magnet 2 is low in mechanical strength, as mentioned above. Therefore, the rare-earth magnet 2 is inserted into the non-magnetic metal cylinder 3, and non-magnetic metal disks 4 are shrunken on both ends of the metal cylinder 3 in order to hold both end portions of the metal cylinder 3. With this, the rare-earth magnet 2, which is disposed in the inside of the metal cylinder 3, is held by the metal cylinder 3 and the metal disks 4. Thus, the rotor is maintained in strength and rigidity.

Furthermore, according to a conventional example of FIGS. 47a and 47b, an iron core 5 is disposed about the shaft 1, a plurality of iron core grooves 6, which have a wedge-shaped section, are formed on the peripheral portion of this iron core 5 along the longitudinal direction, rare-earth magnets are disposed in the inside of the iron core grooves 6, and a means for bonding them by using a polymer bond such as epoxy resin is taken. Furthermore, the actual state is that the rare-earth magnets 2 are held by using a reinforcement by hoops using a plastic material (FRP) reinforced with aramid or glass fibers, together with the metal cylinder 3, and thus a rotor resistant to high speed rotation is realized.

The magnetic characteristics are improved remarkably by the appearance of the rare-earth magnet. Permanent magnet type synchronous machines, where these powerful magnets are built in their rotors, have an energy density per unit area that is higher than that of induction machines or coil-type synchronous machines. Therefore, it becomes possible to improve the output, if the rotation speed can be increased. Furthermore, there is an advantage that it becomes possible to make an electric motor or generator smaller in size and improve the same in performance. However, the following problems exist.

First of all, rare-earth magnets made by powder sintering method are inherently brittle materials, and insufficient in mechanical characteristics such as strength, tenacity, toughness and deformative capability, as compared with iron core and other metal materials constituting a rotor. Therefore, if centrifugal force, which acts on a rotor, increases further by the speedup or increase of capacity of electric machines and the like, there arises a problem that a rare-earth magnet tends to deform or break.

For example, an Nd—Fe—B magnet is about 260 (MPa) in flexural strength, and this is not larger than a half of that of a common steel. Its elastic modulus is about 150 (Gpa), and this is about ¾ of that of steel. Furthermore, its breaking elongation is about 0.2%, and this is not larger than 1/10 of that of steel and is very small. Furthermore, it comes to break by only elastic deformation with little plastic deformation. However, it has a characteristic that its compressive strength is two or more times flexural and tensile strengths. A Pr—Fe—B magnet has also a strength that is almost equal to this, but strength of a Sm—Co magnet is still small.

Furthermore, the presence of internal defects, such as voids and small cracks, contained in a magnet prepared by a powder sintering in an argon gas atmosphere under a normal or somewhat vacuum pressure is considered to be one of the causes that make powder sintering magnets lower in strength.

Secondly, it can be said that rare-earth magnets are insufficient in corrosion resistance. In each of Nd—Fe—B magnets, Pr—Fe—B magnets and Sm—Co magnets, each of rare-earth elements of neodymium, praseodymium and samarium is active. Thus, if these rare-earth magnets are allowed to stand still for several days in the atmosphere, their surface will have a different color and their corrosion will proceed. Therefore, they are put into a practical use in general under a condition that they are provided with an epoxy coating, an aluminum-chromate film or a nickel plating with copper bed.

Thirdly, it can be said that bonding strength between a rare-earth magnet and a rotor member metal is insufficient. For example, tensile strength between a rare-earth magnet and copper, which is one of rotor member metals, that have been bonded together with an epoxy resin bond is about 20 (MPa) at room temperature, and this is about ¼ of tensile strength of an Nd—Fe—B magnet.

Furthermore, the bonding strength lowers further at a high temperature that is higher than 100° C. Therefore, bonding strength can hardly be expected in a rotor portion that generates heat to have a temperature of at least 100° C. when it is driven. Furthermore, the heat resisting temperature of a common Nd—Fe—B magnet under use is a maximum of 140–160° C.

Fourthly, it can be said that high-strength bonding technique, which does not deteriorate magnetic characteristics of rare-earth magnets, has not yet been established. That is, it is the actual condition that high-strength bonding technique between magnet and rotor member metal, which can endure a temperature higher than 100° C. caused by heat generated by a rotor, without deteriorating magnetic characteristics of rare-earth magnets in themselves, has not yet been established. As stated above, rare-earth elements are extremely active. Therefore, even though someone tries to braze a rare-earth magnet and a rotor member metal, with a brazing filler metal such as silver, under a high temperature of about 850–900° C., the rare-earth element and the brazing filler metal react violently. Thus, it is extremely difficult to bond them without deteriorating magnetic characteristics of the magnets. Furthermore, the bonding strength becomes not larger than 10 (MPa). There is a problem that silver element as a brazing filer metal diffuses deep into the inside of Nd—Fe—B magnet, and thus coercivity of the magnet lowers greatly.

In connection with the above-mentioned problems, as a means for increasing bonding strength between a rare-earth magnet and a rotor member metal, a method for bonding a rare-earth magnet and another member, such as carbon steel, silicon steel plate, or flat-rolled steel plate, which is different from the magnet, is proposed, for example, in Japanese Patent First Publication JP-A-8-116633. In this method, a bonding member made of a rare-earth based alloy (Nd—Cu alloy) is interposed between the rare-earth magnet and the another member, and they are heated to at least a temperature, at which the liquid phase of the bonding member occurs, and thus bonded using wettability by liquefaction of the bonding member.

JP-A-7-116866 proposes a method for conducting a diffusion bonding between a rare-earth magnet's raw material, which has not yet been magnetized, and a supporting member such as carbon steel or stainless steel, by a hot process where they are pressurized under a particular condition.

Although its object is not a rare-earth magnet, JP-A-7-232284 discloses a method for conducing a diffusion bonding between a titanium alloy member and an iron based metal member, with an intermediate member that is a combination of a vanadium thin plate (or tantalum thin plate) and a copper thin plate. In this method, the titanium alloy member, the vanadium thin plate, the copper thin plate, and the iron based metal member are disposed in sequence and are bonded together by diffusion by holding them under pressure after heating them at a temperature lower than the melting point of copper.

Furthermore, JP-A-1-171215 (Japanese Patent No. 2571244) proposes a method for producing a rare-earth-Fe—B metal laminate. In this method, a magnet having a basic composition that is a combination of a rare-earth element (Y is included therein), a transition metal, and boron is produced. This magnet and another object for forming the laminate are put into a hermetic container, and then the container is sealed in a vacuum. Then, they are subjected to a hot isostatic pressing treatment at a temperature of 850–1,000° C. With this, the magnet and the another object are monolithically bonded together. An iron core, iron plate or ceramic is used as the another object.

However, according to the above proposal of JP-A-8-116633, the rare-earth based alloy as the bonding member is high in activity. Therefore, it is easily oxidized by a reaction with oxygen, and there arise problems that the resultant oxide comes off the bonded portion, thereby to lower the bonding strength, and surrounding devices are contaminated. Furthermore, the bonding member in itself contains a large amount of rare-earth element of high price. Thus, there is a problem that the raw material cost increases.

According to the proposal of JP-A-7-116866, the pressurization by the hot process is a uniaxial pressurization. Therefore, in case that the surfaces to be bonded together are curved surfaces, it is difficult to uniformly pressurize the entire surfaces. Thus, the bonding strength varies. Furthermore, for example, in case that a supporting member is bonded to the entire peripheral surface of a cylindrical magnet, this method can not be adopted. Thus, there is a problem that the shape of an object to be bonded is limited.

The proposal of JP-A-7-232284 is a method for bonding a titanium alloy member with an iron based member, which is a so-called structural material, such as steel and stainless steel. It is impossible to directly apply them to rare-earth magnets that are completely different therefrom in texture and condition.

According to the proposal of JP-A-1-171215, the rare-earth magnet is a cast magnet, and the another object for forming the laminate is an iron core, an iron plate, a ceramic, and the like. Thus, it is different from an alloy material of the invention, which is a high melting-point metal or high specific-tenacity material, as an object to be laminated.

Thus, the present invention was made in view of the above, and its object is to provide a high-strength bonding structure and a bonding method that are capable of monolithically bonding a rare-earth magnet with an alloy material that is a high melting-point metal or high specific-tenacity material, without deteriorating magnetic characteristics, such that the rare-earth magnet's insufficiency in strength, rigidity, tenacity and the like is compensated.

DISCLOSURE OF THE INVENTION

A monolithically bonded construct of a rare-earth magnet and a metal material has basic ways that are a monolithically bonded construct of a rare-earth magnet and a metal material that have monolithically been bonded together through a solid phase diffusion bonding by a hot isostatic pressing (hereinafter abbreviated as HIP treatment) of a rare-earth magnet and a high melting-point metal, as described in claim 1, a monolithically bonded construct of a rare-earth magnet and a metal material that have monolithically been bonded together through a solid phase diffusion bonding by a HIP treatment of a rare-earth magnet and an alloy material that is a high specific-tenacity material, as described in claim 2, and a monolithically bonded construct prepared by bonding together a rare-earth magnet and an alloy material that is a high specific-tenacity material, with an interposal of an intermediate member that is a high-melting-point metal thin layer, through solid phase diffusion bonding by HIP treatment, as described in claim 3. One of the characteristics is that a superplastic titanium alloy is used as a high specific-tenacity material. The intermediate member has a thickness of from 2 to 200 µm.

The thickness of a diffusion layer formed between the rare-earth magnet and the alloy material that is a high specific-tenacity material is adjusted to be in a range of 0.04–6.0%, based on the thickness of the rare-earth magnet. In case that the high specific-tenacity material is a superplastic titanium alloy, as recited in claim 6, the thickness of the diffusion layer formed between the rare-earth magnet and the superplastic titanium alloy is adjusted to be in a range of 0.2–1.0%, based on the thickness of the rare-earth magnet.

According to the present invention, there is provided a method for monolithically bonding together a rare-earth magnet and a metal material of the present invention. In this method, as recited in claim 10, a rare-earth magnet and a high melting-point metal are laminated together, thereby to prepare an object to be treated. Then, this object is put into a hermetic-type high pressure container having an inner wall portion equipped with a heater. Then, the object is subjected to a HIP treatment in which the object is uniformly pressurized in all directions by the synergistic effect caused by pressure and temperature, while the object is maintained for a certain period of time under a certain pressure and temperature condition in an atmosphere of inert gas, thereby to monolithically bond the object.

As recited in claim 11, an intermediate member that is a high-melting-point metal thin layer is interposed between a rare-earth magnet and an alloy material that is a high specific-tenacity material, and the resultant object to be treated is monolithically bonded by the HIP treatment.

As recited in claim 12, the temperature condition for the bonding in the HIP treatment is adjusted to 650–1,100° C., the pressurization condition is adjusted to 50–300 MPa, and the retaining time is adjusted to 0.5–10.0 h.

Furthermore, as recited in claim 13, there is provided a method in which an object to be treated is prepared by laminating a rare-earth magnet with an alloy material that is a high specific-tenacity material, the temperature condition for the bonding in the HIP treatment is adjusted to 650–850° C., more preferably 700–800° C., the pressurization condition is adjusted to 50–300 MPa, the retaining time is adjusted to 0.5–10.0 h, and the object is monolithically bonded. There is provided by claim 6 a case in which the high specific-tenacity material is a superplastic titanium alloy.

As recited in claims 7 and 14, the rare-earth magnet is one selected from Nd—Fe—B magnets, Pr—Fe—B magnets and Sm—Co magnets. As recited in claims 8 and 15, the high-melting-point metal is one selected from tantalum (Ta), molybdenum (Mo), tungsten (W), vanadium (V), niobium (Nb), zirconium (Zr) and hafnium (Hf).

Furthermore, as recited in claims 9 and 16, the alloy material that is a high specific-tenacity material is one selected from titanium alloys, superplastic titanium alloys, nickel alloys, high manganese steels, silicon steels, low carbon steels, low alloy steels, austenite stainless steels, ferrite stainless steels, martensite stainless steels, maraging steel, and Permalloy.

According to the monolithically bonded construct of the rare-earth magnet and the metal material and the method for bonding thereof, there are provided characteristics that the rare-earth magnet, which has monolithically been bonded therewith by the HIP treatment, does not form an intermetallic compound with an alloy material such as a high specific-tenacity titanium alloy, and has few bonding defects, and does not form a brittle layer with a high strength steel. In particular, it becomes possible to strongly monolithically bond the rotor member metal such as of rotor and the rare-earth magnet, without making the rare-earth magnet's original characteristics inferior, by the use of a high melting point metal as an intermediate material and the use of a superplastic titanium alloy as a high specific-tenacity material, even if an intermediate material is omitted. Furthermore, it becomes possible to obtain the bonding strength at high temperature, which is different from a bonding with a conventional polymer bond.

In the above-mentioned HIP treatment, the object to be treated is isostatically pressurized at high temperature and high pressure. Therefore, voids existing in conventional magnet materials are compressed and broken. With this, it becomes possible to obtain a compact magnet, and thus the magnet itself is improved in strength and tenacity.

Furthermore, as a composite material of magnet and metal, it is greatly improved in torsional strength and rigidity, and it is possible to provide the magnet side with compressive stress in the cooling process after the HIP treatment, by using a metal having a thermal expansion coefficient larger than that of magnet.

BRIEF DESCRIPTION OF THE DRAWINGS

FIG. 6 is a graph showing the results of the measurement of demagnetizing characteristics with respect to the present example and comparative example.

FIG. 11 is a photograph showing the characteristic X-rays image of the Ti element distribution of the bonded portion of FIG. 7.

FIG. 12 is a photograph showing the characteristic X-rays image of the Al element distribution of the bonded portion of FIG. 7.

FIG. 14 is a photograph showing the secondary electron image of the bonded portion of rare-earth magnet and titanium alloy in case that Ta was used as an intermediate material.

FIG. 15 is a photograph showing characteristic X-rays image where the Nd element distribution of the bonded portion of rare-earth magnet and titanium alloy of FIG. 14 was taken by EPMA.

FIG. 24 is a photograph showing the characteristic X-rays image of the Fe element distribution of the bonded portion of FIG. 22.

FIG. 25 is a photograph showing the characteristic X-rays image of the B element distribution of the bonded portion of FIG. 22.

FIG. 26 is a photograph showing the characteristic X-rays image of the Mo element distribution of the bonded portion of FIG. 22.

FIG. 27 is a photograph showing the characteristic X-rays image of the Ti element distribution of the bonded portion of FIG. 22.

FIG. 46b is a sectional view taken along the lines B—B of FIG. 46a.

FIG. 47b is a sectional view taken along the lines B—B of FIG. 47a.

BEST MODE FOR CARRYING OUT THE INVENTION

In the following, the best mode for carrying out the present invention will be described in detail by reference to the drawings.

The present invention provides as a basic means a construct prepared by monolithically bonding together a rare-earth magnet and a high melting point metal, or a rare-earth magnet and a high specific-tenacity material through the solid phase diffusion bonding by HIP treatment. By modifying this basic means, there is obtained a monolithically bonded construct prepared by HIP treatment by the solid phase diffusion bonding with an interposal of a thin layer of the above-mentioned high melting point metal as an intermediate material between a rare-earth magnet and a high specific-tenacity material.

The above-mentioned rare-earth magnet is one selected from Nd—Fe—B magnets, Pr—Fe—B magnets and Sm—Co magnets. The high-melting-point metal is one that has a melting point of at least 1,800° C. and is selected from tantalum (Ta), molybdenum (Mo), tungsten (W), vanadium (V), niobium (Nb), zirconium (Zr) and hafnium (Hf).

In general, rare-earth magnets are produced by powder metallurgy method, forging method, rolling method, and the like. Furthermore, Nd—Fe—B magnet is produced by hot pressing of super-quenching magnet powder or hot plastic process of super-quenching magnet powder.

Any of the rare-earth magnets obtained by the above-mentioned methods can be used as a rare-earth magnet of the present invention. Of these, sintered magnets prepared by powder metallurgy are preferable, and in particular Nd—Fe—B sintered magnets are the most preferable.

The main object of the present invention is to well maintain the magnetic characteristics of a rare-earth magnet by preventing the diffusion of another metal material into the rare-earth magnet as much as possible and to improve the bonding strength by forming a reaction layer at the bonding surface between the rare-earth magnet and the another metal material. As a means therefor, the present invention has main characteristics that the bonding strength is maintained by providing a function for preventing the another metal material from diffusing into the magnet by the provision of a thin layer of the above-mentioned high melting point metal material as the intermediate member.

Figure 1A:
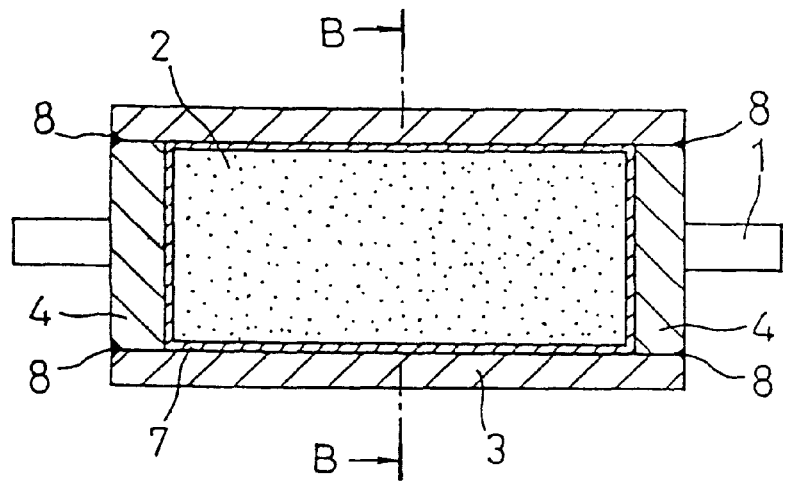
FIG. 1*a* is a sectional view of an essential part showing a first example in which the present example is applied to a rotor construction.
Figure 1B:
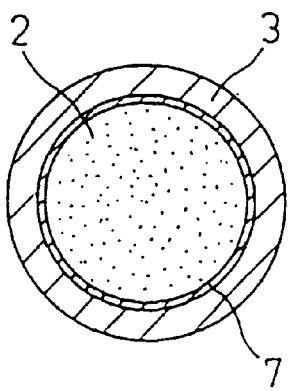
FIG. 1*b* is a sectional view taken along lines B—B of FIG. 1*a*.

FIG. 1a is a sectional view of an essential part showing the first example in which the present invention has been applied to a rotor structure, and FIG. 1b is a sectional view taken along lines B—B of FIG. 1a. In the drawings, 1 is a shaft, 2 is a rare-earth magnet, 3 is a metal cylinder of non-magnetic material, and 4,4 are metal disks of non-magnetic material.

An intermediate member 7 of high melting point metal, which is a characteristic structure of the present invention's example, is interposed at a boundary portion between the rare-earth magnet 2 and the metal cylinder 3 and metal disks 4,4 and is monolithically bonded by the HIP treatment. Furthermore, 8, 8 are portions welded by the electron beam, where the vacuum degassing and sealing were conducted upon the HIP treatment.

The above rare-earth magnet 2 is a magnet of high magnetic energy product containing as a component an active rare-earth element such as neodymium (Nd), praseodymium (Pr) and samarium (Sm). In the present example, an Nd—Fe—B sintered magnet (NEOMAX-35H made by Sumitomo Special Metals Co., Ltd.) was used. The order of the amounts of the energy products of these rare-earth magnets is as follows: Nd—Fe—B magnet>Pr—Fe—B magnet>>Sm—Co magnet. On the other hand, the order of Curie points, indicating heat resistance, is as follows:

Sm—Co magnet>>Nd—Fe—B magnet>Pr—Fe—B magnet.

As the metal cylinder 3 and the metal disks 4, a high specific-strength titanium alloy (6Al—4V alloy, SP700 alloy) was used. Furthermore, a nickel based alloy, such as Inconel and Hastelloy, may be used in place of a titanium alloy.

Figure 2A:
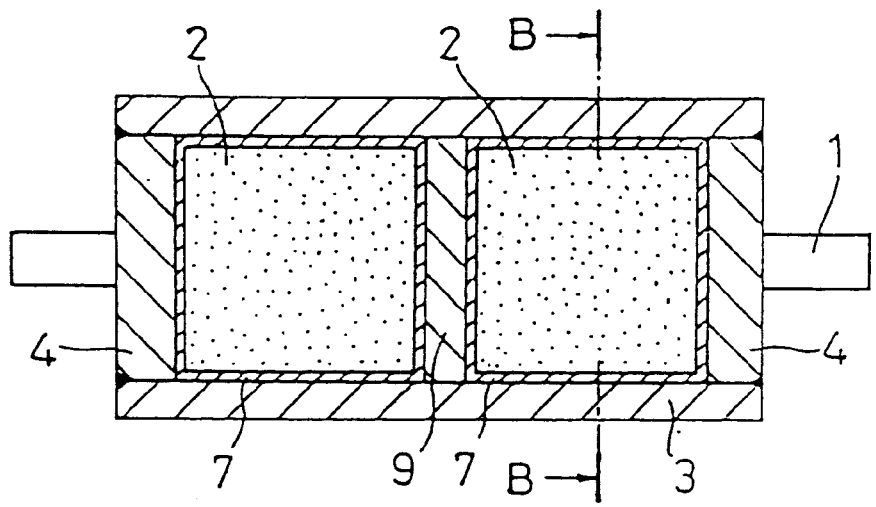
FIG. 2*a* is a sectional view of an essential part showing a second example.
Figure 2B:
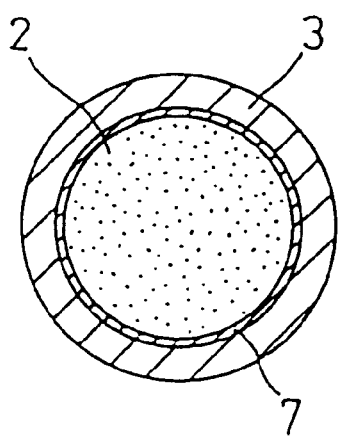
FIG. 2*b* is a sectional view taken along lines B—B of FIG. 2*a*.

FIG. 2a is a sectional view of an essential part showing the second example of the present invention, and FIG. 2b is a sectional view taken along lines B—B of FIG. 2a. In this example, the rare-earth magnet 2 is divided into two pieces, and a non-magnetic disk 9 is interposed and fixed at a boundary portion of these. The other structures correspond to the first example. According to this second example, it is possible to realize a large-size rotor structure by bonding together many rare-earth magnets 2 by the HIP treatment.

Figure 3A:
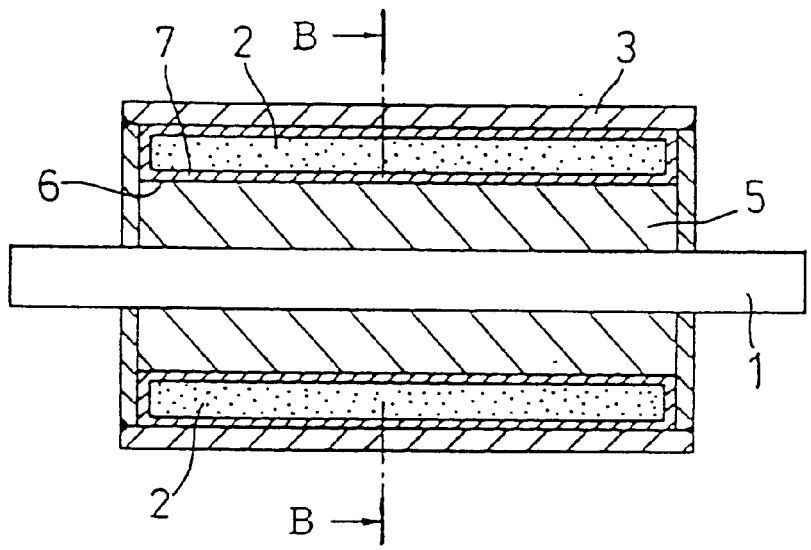
FIG. 3*a* is a sectional view of an essential part showing a third example.
Figure 3B:
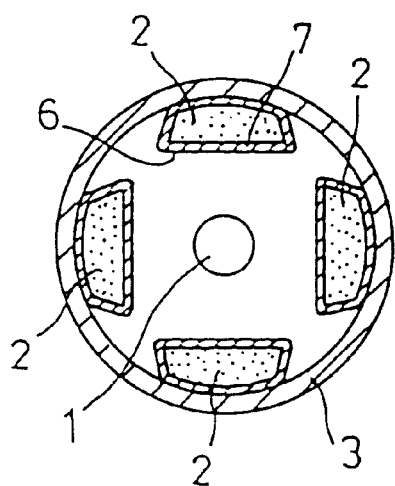
FIG. 3*b* is a sectional view taken along line B—B of FIG. 3*a*.

FIG. 3a is a sectional view of an essential part showing the third example of the present invention, and FIG. 3b is a sectional view taken along lines B—B of FIG. 3a. In this example, an iron core 5 is disposed about a shaft 1. A plurality of iron core grooves 6, which have a wedge-shaped section, are formed on the peripheral portion of this iron core 5 along the longitudinal direction. Rare-earth magnets are disposed in the inside of the iron core grooves 6, and an intermediate member 7 is fixed at a boundary portion between this rare-earth magnet 2 and the iron core groove 6 by bonding through the HIP treatment. The other structures correspond to the first and second examples.

A high melting point metal used as the intermediate member 7 has a function of preventing a direct reaction between the rotor member metal, such as the metal cylinder 3 and the metal disk 4, and the rare-earth magnet 2. This intermediate member 7 by itself slightly reacts with the rare-earth magnet 2 or generates the mutual diffusion. The thickness of the intermediate member 7 is basically from 2 to 200 $\mu$m. This intermediate member 7 serves as a barrier layer to suppress a reaction between the rare-earth magnet 2 and the rotor member metal. At the bonding interface between this intermediate member 7 and the rotor member metal, the mutual diffusion occurs, but a brittle layer is not formed.

The reason of making the thickness of the intermediate member 7 to be from 2 to 200 $\mu$m is as follows. If the thickness of the intermediate member 7 is not greater than 2 $\mu$m, it does not serve as the above-mentioned barrier layer. If the thickness of the intermediate member 7 is not less than 200 $\mu$m, it becomes difficult to conduct the monolithic bonding step with an interposal of the intermediate member 7.

A thin sheet of the above-mentioned high melting point metal was used as the intermediate member 7. This high melting point metal generates the mutual diffusion at a high bonding temperature, but does not form an intermetallic compound together with a high specific-strength titanium alloy that is a non-magnetic active metal, nor form a brittle layer together with a non-magnetic high-strength nickel-based alloy or a ferromagnetic or non-magnetic high-strength steel. This thin sheet is preferably one that has been subjected to vacuum annealing in view of molding.

As a bonding method for achieving each of the above-mentioned examples, there was used a monolithic bonding method through a hot isostatic pressing treatment (HIP treatment) in order to firmly bond together a rotor member metal of rotor and a rare-earth magnet, while magnetic characteristics of the rare-earth magnet in itself are barely made low.

The outline of this HIP treatment will be explained as follows. An object to be treated is put into a hermetic-type high pressure container having an inner wall portion equipped with a heater. Then, the object is uniformly pressurized in all directions by the synergistic effect caused by pressure and temperature, while the object is maintained for a certain period of time under a certain pressure and temperature condition in an atmosphere of inert gas such as argon gas, thereby to monolithically bond the object.

Figure 4:
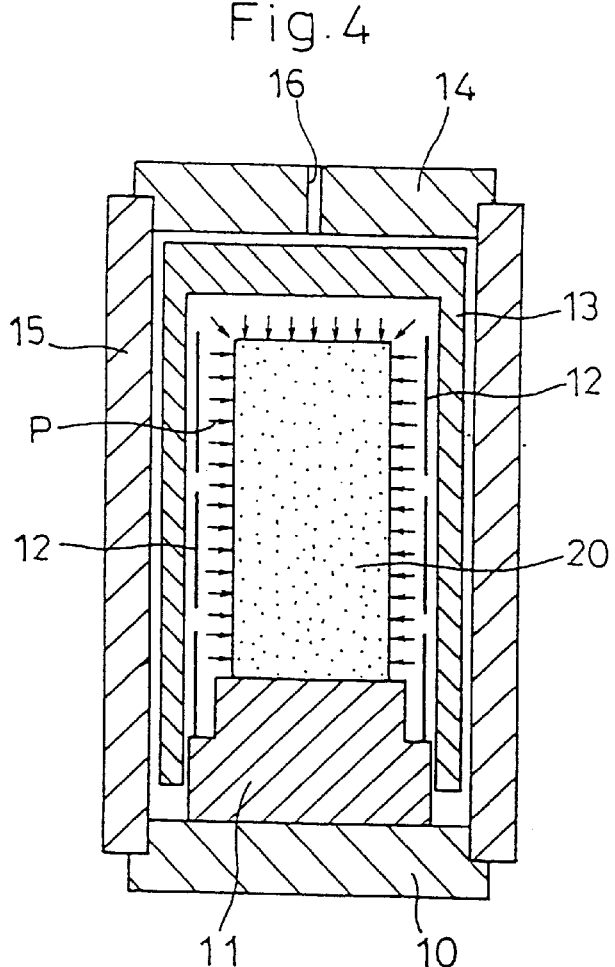
FIG. 4 is a schematic diagram showing an example of hot isostatic pressing used in the present example.

A concrete example of the above-mentioned HIP treatment will be explained, based on a schematic diagram of FIG. 4. That is, a hermetic high pressure container is constructed as follows. An object 20 to be treated is disposed on a supporting base 11 installed on a lower lid 10. The surrounding of the object 20 is fully covered by an insulating layer 13 having an inner wall portion, on which a plurality of steps of heaters 12, 12 are disposed. A high pressure cylinder as an outer frame member is fixed to an upper lid 14 and the lower lid 10 such that it is disposed therebetween. This upper lid 14 is preliminarily formed with a gas inflow opening 16.

Furthermore, argon gas as an inert gas, acting as a pressuring medium, is introduced from the gas inflow opening 16, and the object 20 is normally subjected to a pressure of at least 50–300 (MPa) and a temperature of at least 600–1,100 (° C.). Thus, the object 20 is uniformly pressurized in all directions, as shown by arrows P, by the synergistic effect of pressure and temperature.

Based on the metal material of a rotor member, the conditions of the HIP treatment are selected from the bonding temperatures, retaining times and the added pressures shown in Table 1, depending on the sizes and shapes of the members to be bonded together and characteristics of the intermediate member in case that the intermediate member is used.

TABLE 1

| Metal Material of Rotor Member | Bonding Temp. | Retaining Time | Added Pressure |
| --- | --- | --- | --- |
| (1) Titanium, Titanium Alloy | 750–950° C. | 0.5–5.0 hr | 50–200 MPa |
| (2) Nickel-based Alloy | 900–1,100° C. | 1.0–10.0 hr | 50–300 MPa |
| (3) Steel | 900–1,100° C. | 0.5–10.0 hr | 50–300 MPa |
| (4) Superplastic Titanium Alloy | 650–850° C. | 1.0–10.0 hr | 50–300 MPa |

Furthermore, in case that the solid phase diffusion bonding is conducted by the HIP treatment, it is necessary, prior to this, to conduct a step (i.e., canning step) in which bonding portions of the object to be treated are subjected to vacuum degassing and sealing by the electron beam welding or the like. The degree of vacuum upon welding is preferably higher than $1 \times 10^{-1}$ Pa, that is, at least $1 \times 10^{-2}$ Pa.

As shown by the rotor structures of rotor machines of the above-mentioned FIGS. 1–3, it is necessary to take an isostatic pressurization method such as HIP treatment in case that the bonded portion between the intermediate member 7 and the rotor member metal does not constitute only one flat surface in the same direction. However, in case that the bonded portion constitutes only one flat surface in the same direction, it is optional to take a uniaxial pressurization method in which the bonded surface is pressurized in a direction perpendicular thereto.

EXAMPLES

In the following, examples of the present invention will be explained, based on concrete data. In the present example, a rotor structure sample shown in the above-mentioned FIG. 2 was made, and a solid-phase diffusion bonding experiment was conducted by the HIP treatment in case that the intermediate member was interposed therebetween.

1. [Test Material]

As a test material, a rare-earth magnet 2, a columnar Nd—Fe—B sintered magnet (the above-mentioned NEOMAX-35H) having dimensions of φ10.0×10 mm under non-magnetized condition was used. A 6Al—4V titanium alloy annealed material having an inner diameter of φ10.2 mm, an outer diameter of 16.2 mm, a thickness of 3 mm, and a length of 35 mm was used for a non-magnetic metal cylinder 3. A 6Al—4V titanium alloy disk annealed material having dimensions of φ10.1 mm×5 mm was used for non-magnetic metal disks 4,4 and a non-magnetic disk 9.

A high melting-point metal thin sheet having a thickness of 50 μm was used as an intermediate member 7, and three types, tantalum (Ta), molybdenum (Mo) and tungsten (W), were used. For examining the effect of this intermediate member 7, that is, for comparison, a test sample not having an interposal of the intermediate member 7 was Comparative Example (1), and Examples (1), (2) and (3), in which tantalum (Ta), molybdenum (Mo) and tungsten (W) were used as the intermediate members 7, were prepared.

2. [HIP Treatment]

Using the above-mentioned test materials, as shown in FIG. 2, rare-earth magnets 2 covered with the intermediate member of one of Ta, Mo and W and the non-magnetic disk 9 made of 6Al—4V titanium alloy were inserted into a non-magnetic metal cylinder 3 made of 6Al—4V titanium alloy. Then, non-magnetic metal disks 4,4 made of 6Al—4V titanium alloy are inserted into both end opening portions of the non-magnetic metal cylinder 3 to close the same. Then, the non-magnetic metal cylinder 3 and the non-magnetic metal disks 4, 4 are welded together in a vacuum of $1 \times 10^{-2}$ (Pa) by electron beam. There was conducted a treatment to maintain these samples in an argon gas atmosphere pressurized to 100 (MPa) at 900° C. for 60 minutes using a HIP device shown in FIG. 4, and they were cooled down to room temperature.

Figure 5:
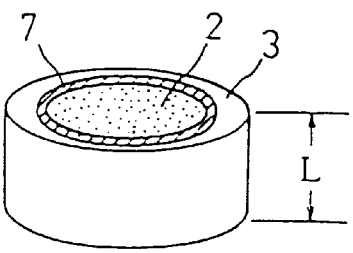
FIG. 5 is a view of the appearance of a sample for determining magnetic characteristics of the present example and comparative example.

Then, the sample after the cooling was taken out of the HIP device, and as shown in FIG. 5 a portion having the rare-earth magnet 2 and the metal cylinder 3 was cut at the magnet portion in a direction perpendicular to the cylinder axis. Then, disklike samples (L=8 mm) were prepared by processing only the both end surfaces. The bonding interface of one sample was subjected to an EPMA analysis (X-ray microanalyzer), and another sample after its magnetization was subjected to the magnetic characteristics measurement.

3. [Results]

3-1 Observation with Metallograph and Measurement of Section Hardness

The observation results of each test material of the above-mentioned Comparative Example (1) and Examples (1), (2) and (3) using a metallograph are put together in Table 2. This is a table for comparing the results depending on the existence and nonexistence of the intermediate member and the differences in intermediate member. The linear expansion coefficients of the rare-earth magnet, titanium alloy and intermediate members (three types of Ta, Mo and W) are shown in Table 3, and the intermediate members have linear expansion coefficients close to that of the rare-earth magnet.

TABLE 2

METALLOGRAPH OBSERVATION RESULTS DEPENDING ON THE DIFFERENCE OF INTERMEDIATE MEMBERS

| | Nd-Fe-B Rare-earth Magnet | Intermediate Members Ta Mo W | Titanium Alloy SAT64 |
| --- | --- | --- | --- |
| Comparative Example (1) | Black-color crystal grains range in a circle that is 10–20 μm inside from the bonding interface. A reaction layer of about 20 μm is formed at the bonding interface. | — | A reaction layer is formed at the bonding interface. |
| Example (1) (Intermediate Member Ta) | A reaction layer is not formed at the bonding interface. | A thickness of 50 μm did not change even after HIP treatment. | A reaction layer is not formed at the bonding interface. |
| Example (2) (Intermediate Member Mo) | A reaction layer is not formed at the bonding interface. | A thickness of 50 μm did not change even after HIP treatment. | A reaction layer is not formed at the bonding interface. |
| Example (2) (Intermediate Member W) | A reaction layer is not formed at the bonding interface. | A thickness of 50 μm did not change even after HIP treatment. | A reaction layer is not formed at the bonding interface. |

TABLE 3

LINEAR EXPANSION COEFFICIENTS OF MAGNET, TITANIUM ALLOY AND INTERMEDIATE MEMBER

|  | Rare-earth Magnet Nd-Fe-B | Titanium Alloy SAT64 | Ta | Mo | W |
|---|---|---|---|---|---|
| Linear Expansion Coefficient (X $10^6$) | 5.8 | 8.8 | 6.5 | 5.1 | 4.5 |

Table 4 shows the results of the measurement of the pushing load dependency to Vickers hardness of the rare-earth magnet, intermediate members (three types of Ta, Mo and W) and 6Al—4V titanium alloy according to Examples (1), (2) and (3), respectively, and each material has a tendency that the hardness becomes higher as the load becomes smaller.

Table 5 shows the results of the measurement of Vickers hardness (a load of 25 gf) with respect to Comparative Example (1) and Examples (1), (2) and (3). The hardness values of the intermediate member and the titanium alloy, which are metal materials, are lower than that of the magnet. The hardness values of the intermediate member are in an order of tungsten (W)>molybdenum (Mo)>tantalum (Ta), and the hardness values of molybdenum (Mo) and tantalum (Ta) are lower than that of titanium alloy. Therefore, the intermediate members are in an order of tantalum (Ta) >molybdenum (Mo)>tungsten (W) with respect to deformative capability.

TABLE 4

RESULTS OF LOAD DEPENDENCY TO VICKERS HARDNESS

| Base Material | Rare-earth Magnet | | | | Intermediate Member (Ta Mo W) | | | | Titanium Alloy (SAT64) | | | |
|---|---|---|---|---|---|---|---|---|---|---|---|---|
| Load (gfw) | 10 | 25 | 50 | 100 | 10 | 25 | 50 | 100 | 10 | 25 | 50 | 100 |
| Example 1 (Intermediate Member Ta) | 1251 | 1149 | 1006 | 882 | 146 | 139 | 117 | 112 | 297 | 317 | 286 | 321 |
| Example 1 (Intermediate Member Mo) | 1219 | 1097 | 891 | 946 | 321 | 283 | 245 | 263 | 446 | 294 | 241 | 310 |
| Example 1 (Intermediate Member W) | 1188 | 1048 | 1049 | 907 | 757 | 572 | 549 | 579 | 389 | 363 | 347 | 340 |

TABLE 5

VICKERS HARDNESS RESULTS DUE TO DIFFERENCE IN INTERMEDIATE MEMBER (Load 25 gf)
(~10 μm): Distance from Bonding Interface

| | Base Material | | | | |
|---|---|---|---|---|---|
| | Rare-earth Magnet | Intermediate Member (Ta Mo W) | Titanium Alloy (SAT64) | Magnet Side | Titanium Alloy Side |
| Comparative Example (1) | 1000–1100 | — | 350–400 | As to hardness of black-color crystal grains of bonding interface, Hv = about 200. As to hardness in the vicinity of bonding interface, Hv = 585 (~5 μm). If about 25 μm distant from bonding interface, hardness is the same as that of base material. | As to hardness in the vicinity of bonding interface, Hv = about 733 (~15 μm). If about 25 μm distant from bonding interface, hardness is the same as that of base material. |
| Example (1) (Intermediate Member Ta) | 1000–1100 | 120–130 | 330–350 | If about 20 μm distant from bonding interface, hardness is the same as that of base material. | The maximum hardness Hv = 394 at a distance of about 25 μm from bonding interface. |

TABLE 5-continued

VICKERS HARDNESS RESULTS DUE TO DIFFERENCE IN
INTERMEDIATE MEMBER (Load 25 gf)
(~10 μm): Distance from Bonding Interface

| | | | Base Material | | |
|---|---|---|---|---|---|
| | Rare-earth Magnet | Intermediate Member (Ta Mo W) | Titanium Alloy (SAT64) | Magnet Side | Titanium Alloy Side |
| Example (2) (Intermediate Member Mo) | 1000–1100 | 250–300 | 300–330 | If about 10 μm distant from bonding interface, hardness is the same as that of base material. | As to hardness in the vicinity of bonding interface, Hv = 320 (~15 μm). As to hardness in the vicinity of bonding interface, Hv = about 366 (~5 μm). If about 10 μm distant from bonding interface, hardness is the same as that of base material. |
| Example (3) (Intermediate Member W) | 1000–1100 | 600–730 | 300–330 | As to hardness in the vicinity of bonding interface, Hv = about 946 (~10 μm). If about 20 μm distant from bonding interface, hardness is the same as that of base material. | As to hardness in the vicinity of bonding interface, Hv = 360–460 (~10 μm). If about 20 μm distant from bonding interface, hardness is the same as that of base material. |

3-2 Analysis by EPMA (X-ray Microanalyzer)

Figure 7:
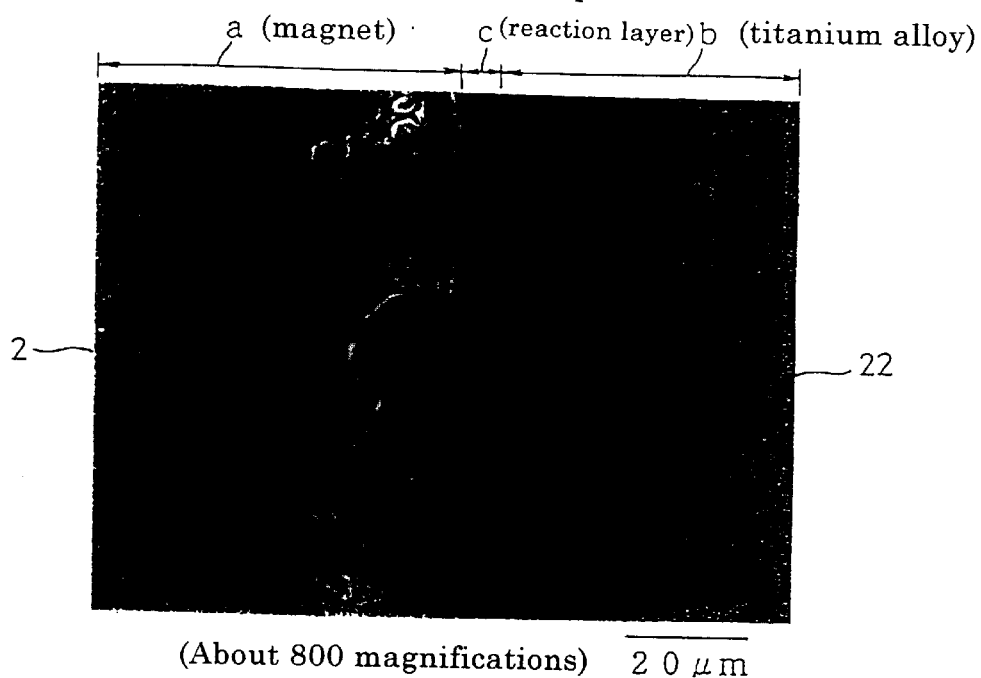
FIG. 7 is a photograph showing a secondary electron image of a bonded portion of rare-earth magnet and titanium alloy in case of no intermediate material.

FIG. 7 is a photograph showing the secondary electron image of the bonding portion between the Nd—Fe—B magnet (rare-earth magnet 2, the above-mentioned NEOMAX-35H) and the titanium alloy 22 in case of omission of the intermediate member (Comparative Example 1), and a, b and c in the drawing respectively refer to a region of the magnet 2, a region of the titanium alloy 22, and a region of the reaction layer. The photograph is of about 800 magnifications.

Figure 8:
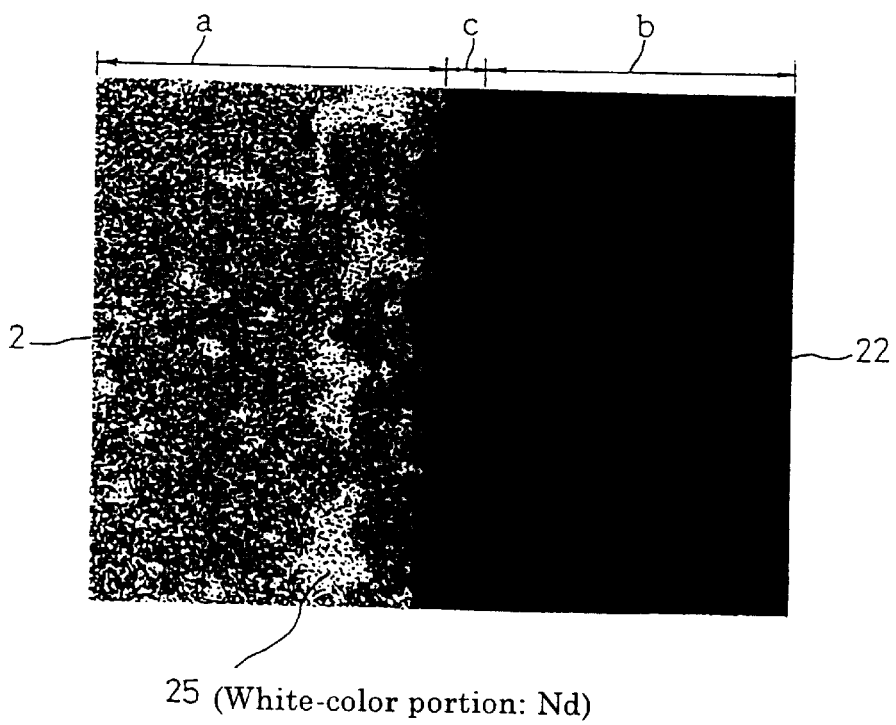
FIG. 8 is a photograph showing characteristic X-rays image where the Nd element distribution of the bonded portion of rare-earth magnet and titanium alloy of FIG. 7 was taken by EPMA.
Figure 9:
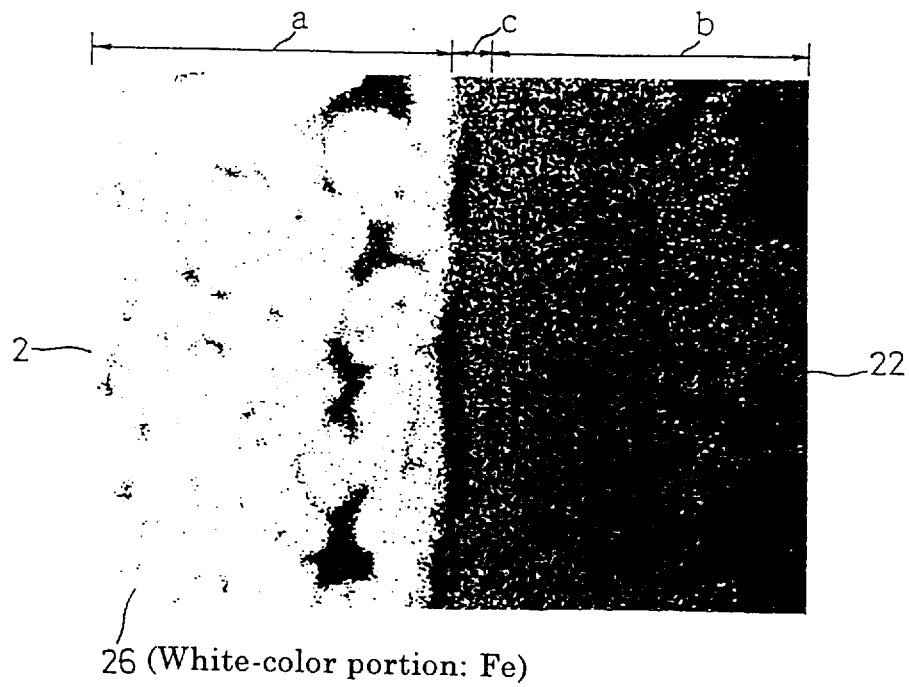
FIG. 9 is a photograph showing the characteristic X-rays image of the Fe element distribution of the bonded portion of FIG. 7.
Figure 10:
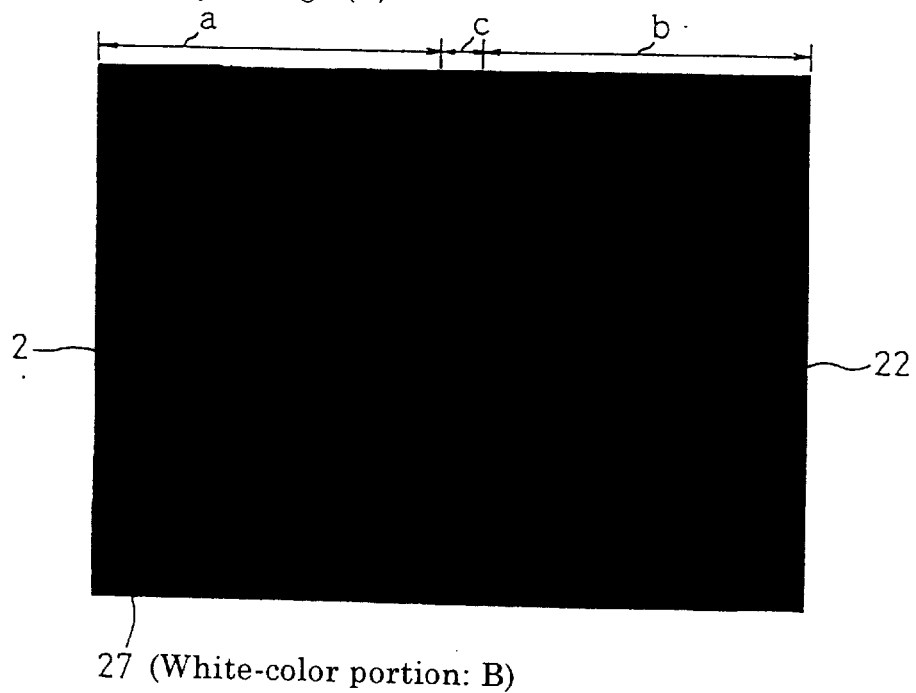
FIG. 10 is a photograph showing the characteristic X-rays image of the B element distribution of the bonded portion of FIG. 7.
Figure 13:
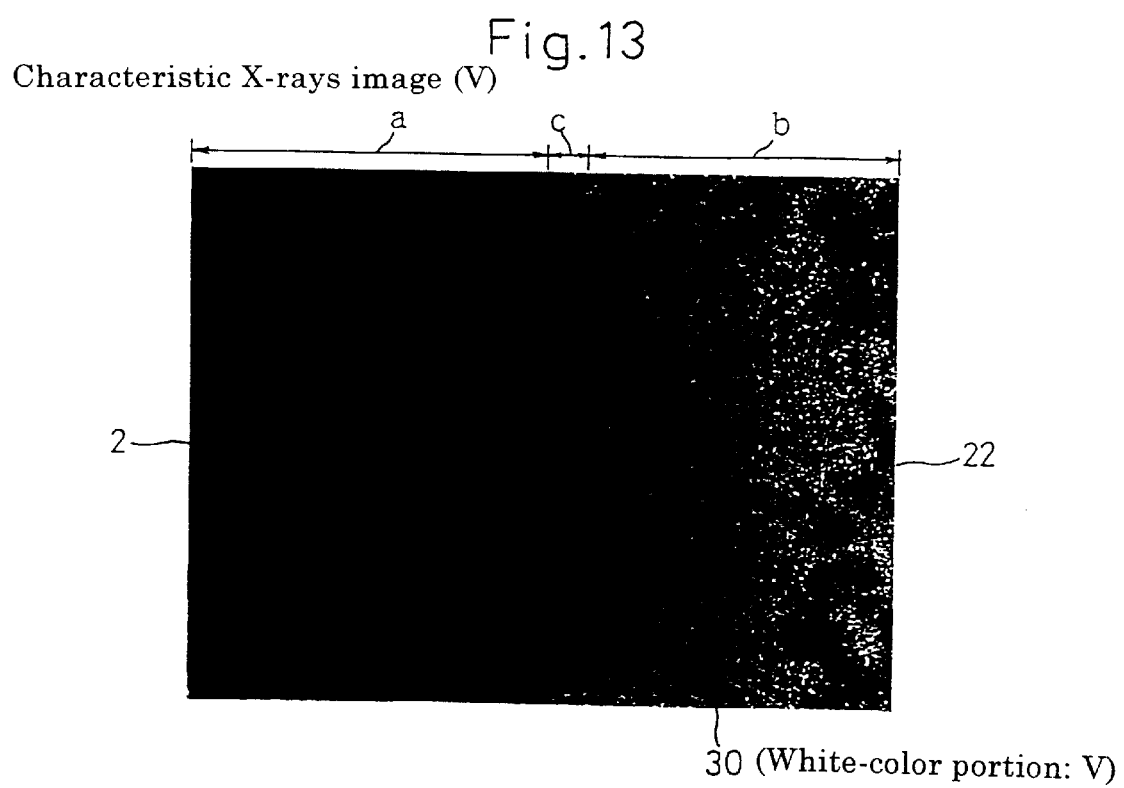
FIG. 13 is a photograph showing the characteristic X-rays image of the V element distribution of the bonded portion of FIG. 7.

FIG. 8 is a photograph showing characteristic X-rays image where the Nd element distribution of the bonded portion of the same magnet 2 and titanium alloy 22 was taken by EPMA, and a white standout portion 25 is Nd detected by X-rays. Regions of a, b and c correspond to those illustrated in FIG. 7. Similarly, FIG. 9 is the characteristic X-rays image of the Fe element distribution of the bonded portion, and a white standout portion 26 in the photograph is Fe detected by X-rays. FIG. 10 is the characteristic X-rays image of the B (boron) element distribution of the bonded portion, and a white standout portion 27 in the photograph is B detected by X-rays. FIG. 11 is the characteristic X-rays image of the Ti element distribution of the bonded portion, and a white standout portion 28 in the photograph is Ti detected by X-rays. FIG. 12 is the characteristic X-rays image of the Al element distribution of the bonded portion, and a white standout portion 29 in the photograph is Al detected by X-rays. FIG. 13 is the characteristic X-rays image of the V (vanadium) element distribution of the bonded portion, and a white standout portion in the photograph is V detected by X-rays.

FIG. 14 is a photograph showing the secondary electron image of the bonded portion of the rare-earth magnet 2 and the titanium alloy 22 in case that tantalum (Ta) was used as an intermediate material (Example 1), and a, b and e in the drawing respectively refer to a region of the magnet 2, a region of the titanium alloy 22, and a region of the intermediate member (Ta).

FIG. 15 is a photograph showing characteristic X-rays image where the Nd element distribution of the bonded portion of the magnet 2 and the titanium alloy 22 was taken by EPMA in case that Ta was used as an intermediate member, and a white standout portion 25 is Nd detected by X-rays. Regions of a, b and e correspond to those illustrated in FIG. 14.

Figure 16:
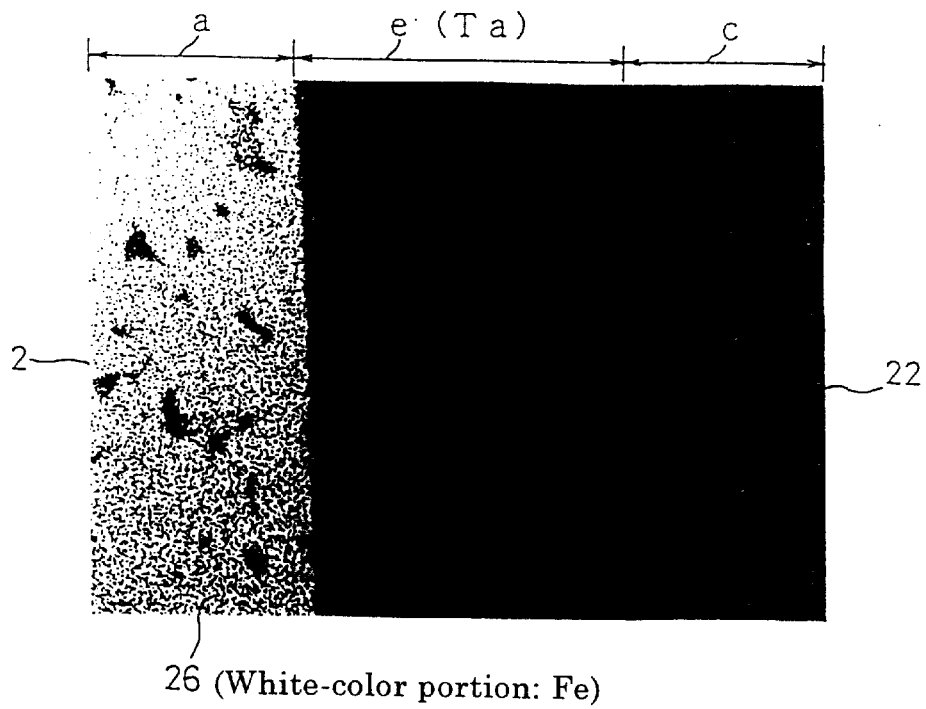
FIG. 16 is a photograph showing the characteristic X-rays image of the Fe element distribution of the bonded portion of FIG. 14.
Figure 17:
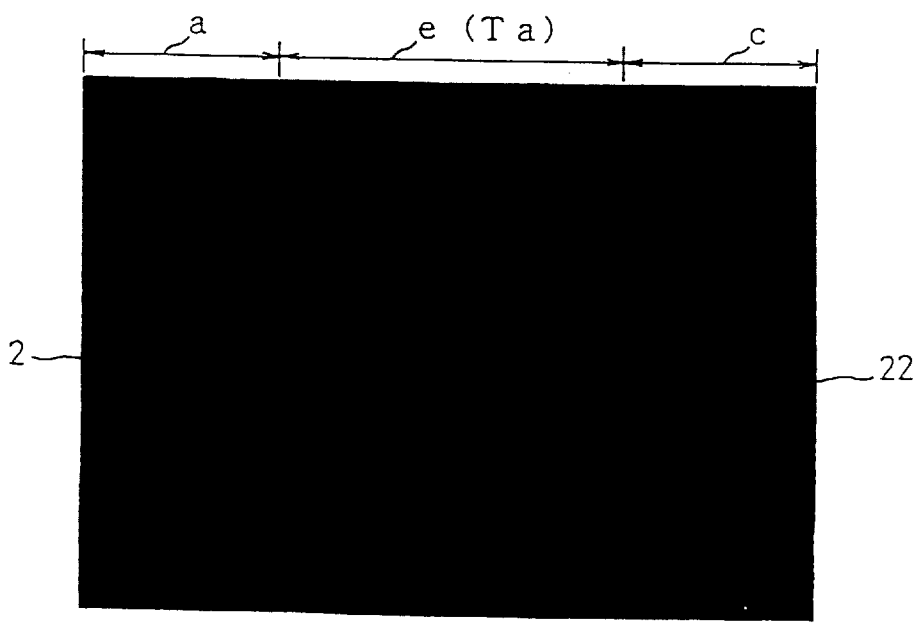
FIG. 17 is a photograph showing the characteristic X-rays image of the B element distribution of the bonded portion of FIG. 14.
Figure 18:
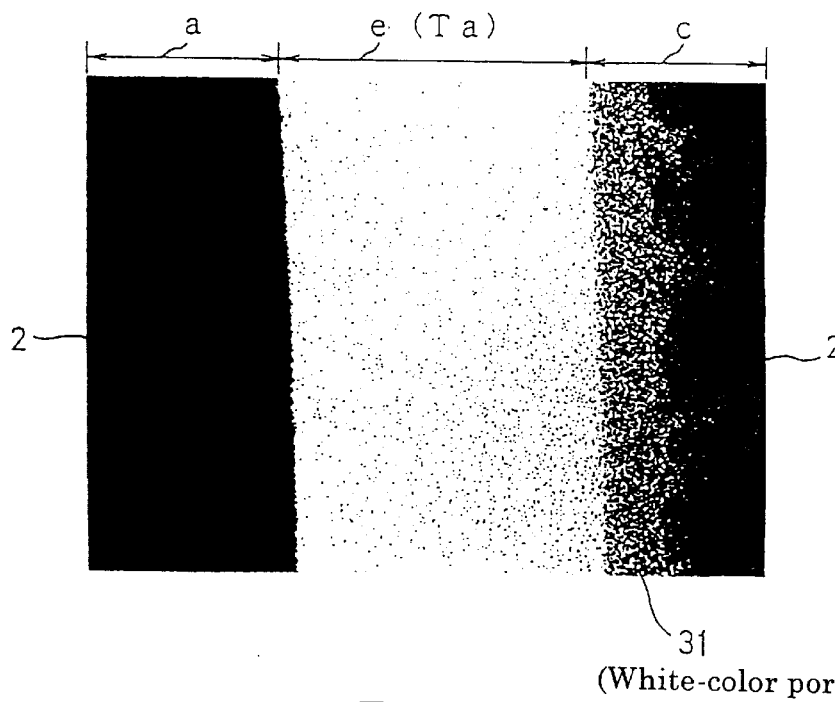
FIG. 18 is a photograph showing the characteristic X-rays image of the Ta element distribution of the bonded portion of FIG. 14.
Figure 19:
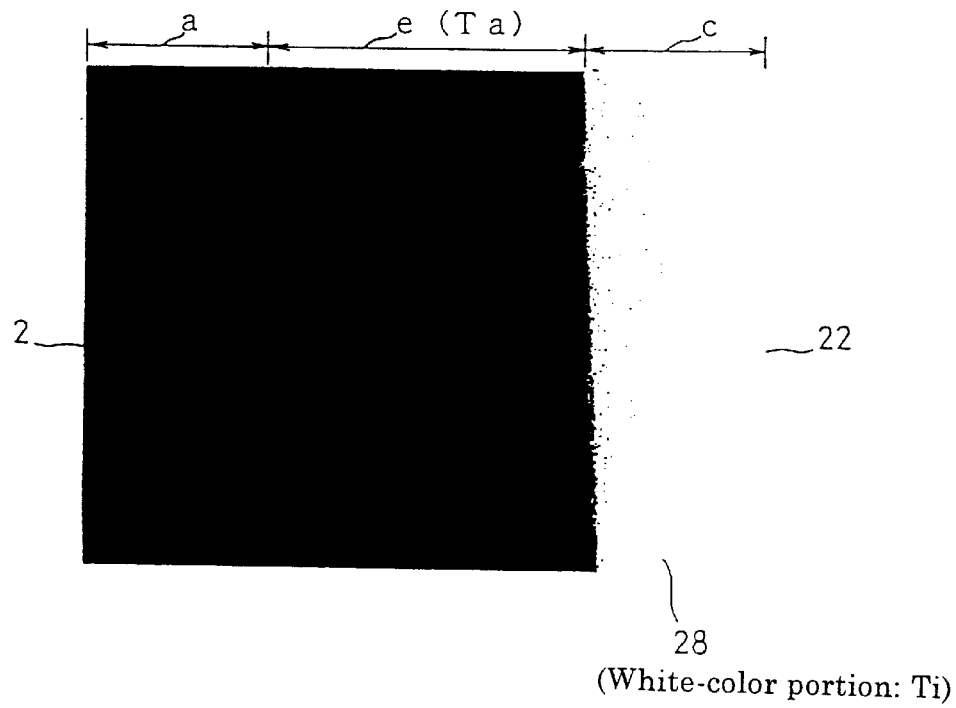
FIG. 19 is a photograph showing the characteristic X-rays image of the Ti element distribution of the bonded portion of FIG. 14.
Figure 20:
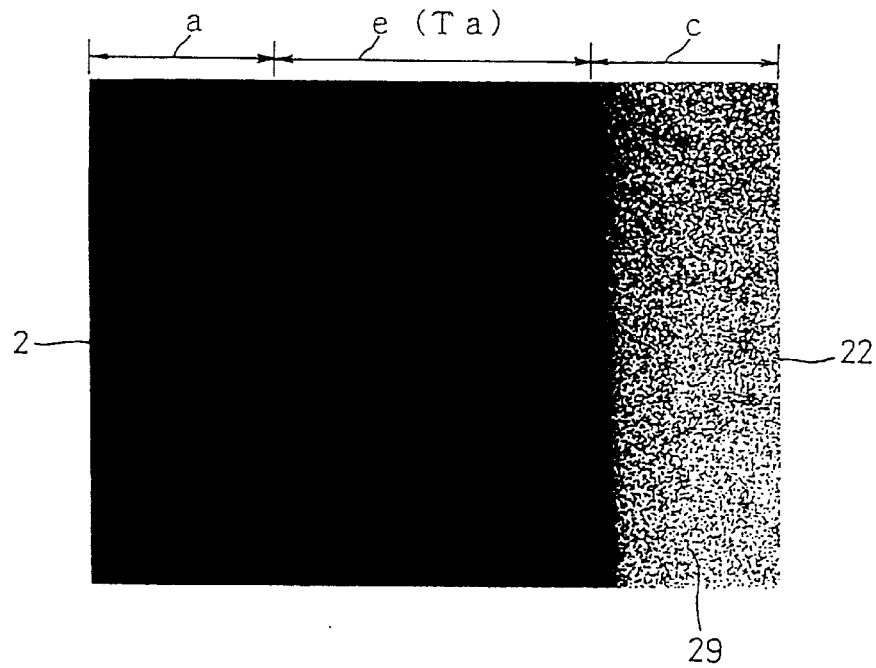
FIG. 20 is a photograph showing the characteristic X-rays image of the Al element distribution of the bonded portion of FIG. 14.
Figure 21:
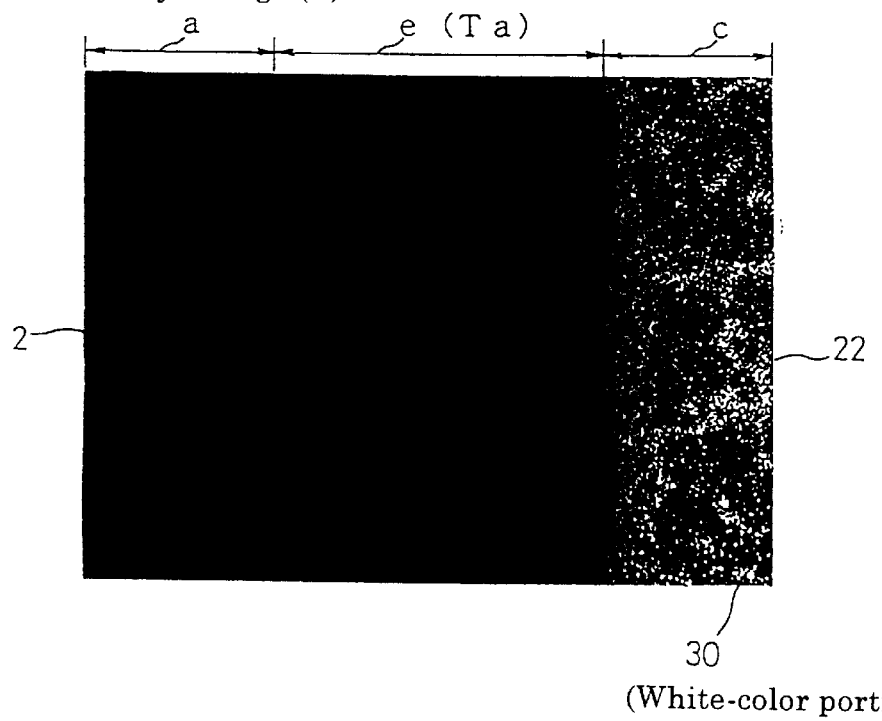
FIG. 21 is a photograph showing the characteristic X-rays image of the V element distribution of the bonded portion of FIG. 14.

In FIGS. 16–21, all of the intermediate members are tantalum (Ta). Similarly, FIG. 16 is the characteristic X-rays image of the Fe element distribution of the bonded portion, and a white standout portion 26 in the photograph is Fe detected by X-rays. FIG. 17 is the characteristic X-rays image of the B element distribution of the bonded portion, and a white standout portion 27 in the photograph is B detected by X-rays. FIG. 18 is the characteristic X-rays image of the Ta element distribution of the bonded portion, and a white standout portion 31 in the photograph is Ta detected by X-rays. FIG. 19 is the characteristic X-rays image of the Ti element distribution of the bonded portion, and a white standout portion 28 in the photograph is Ti detected by X-rays. FIG. 20 is the characteristic X-rays image of the Al element distribution of the bonded portion, and a white standout portion 29 in the photograph is Al detected by X-rays. FIG. 21 is the characteristic X-rays image of the V element distribution of the bonded portion, and a white standout portion 30 in the photograph is V detected by X-rays.

Figure 22:
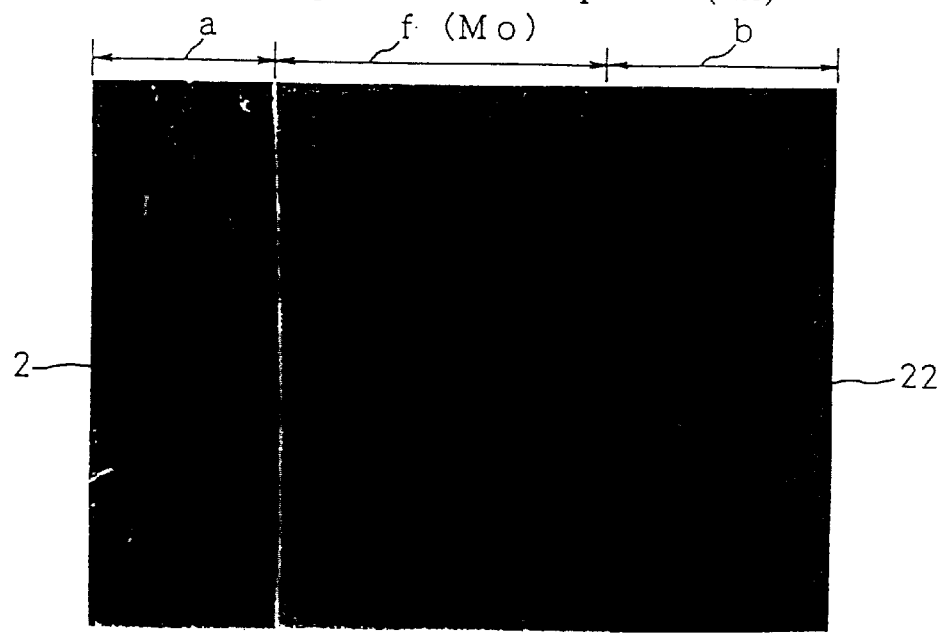
FIG. 22 is a photograph showing the secondary electron image of the bonded portion of rare-earth magnet and titanium alloy in case that Mo was used as an intermediate material.

FIG. 22 is a photograph showing the secondary electron image of the bonded portion of the magnet 2 and the titanium alloy 22 in case that molybdenum (Mo) was used as an intermediate member (Example 2), and a, b and f in the drawing respectively refer to a region of the magnet 2, a region of the titanium alloy 22, and a region of the intermediate member (Mo).

Figure 23:
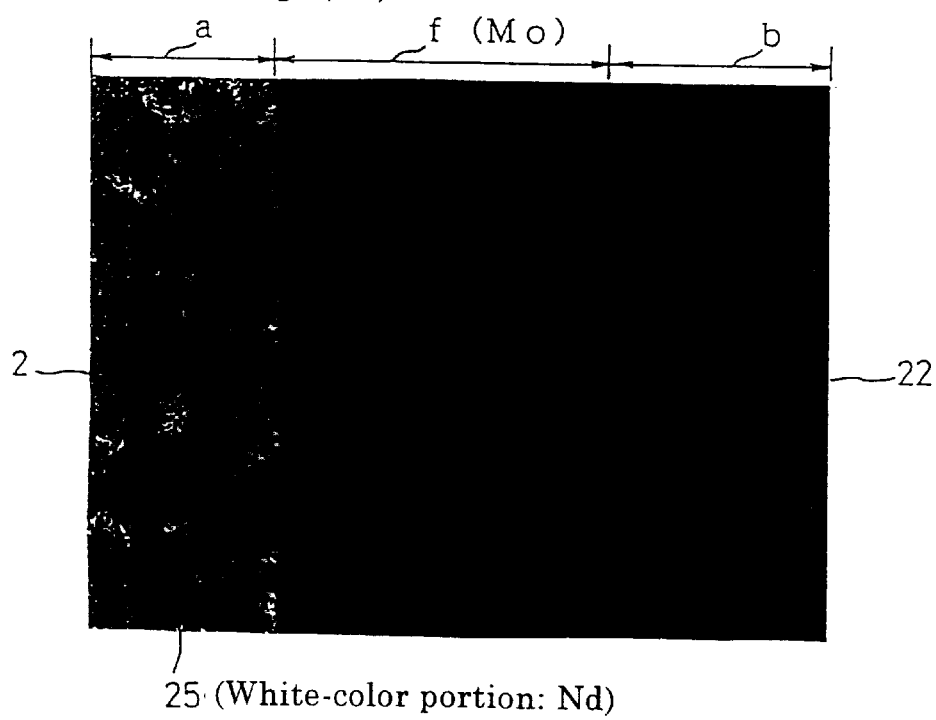
FIG. 23 is a photograph showing characteristic X-rays image where the Nd element distribution of the bonded portion of rare-earth magnet and titanium alloy of FIG. 22 was taken by EPMA.

FIG. 23 is a photograph showing characteristic X-rays image where the Nd element distribution of the bonded portion of the magnet 2 and the titanium alloy 22 was taken by EPMA in case that Mo was used as an intermediate member, and a white standout portion 25 is Nd detected by X-rays. Regions of a, b and f correspond to those illustrated in FIG. 22. Similar to the above example, a white standout portion is the element distribution detected by X-rays, and 25 shown in FIG. 23 is Nd.

In FIGS. 24–29, all of the intermediate members are molybdenum (Mo). Similarly, FIG. 24 is the characteristic X-rays image of the Fe element distribution of the bonded portion, and a white standout portion 26 in the photograph is Fe detected by X-rays. FIG. 25 is the characteristic X-rays image of the B element distribution of the bonded portion, and a white standout portion 27 in the photograph is B detected by X-rays.

Figure 28:
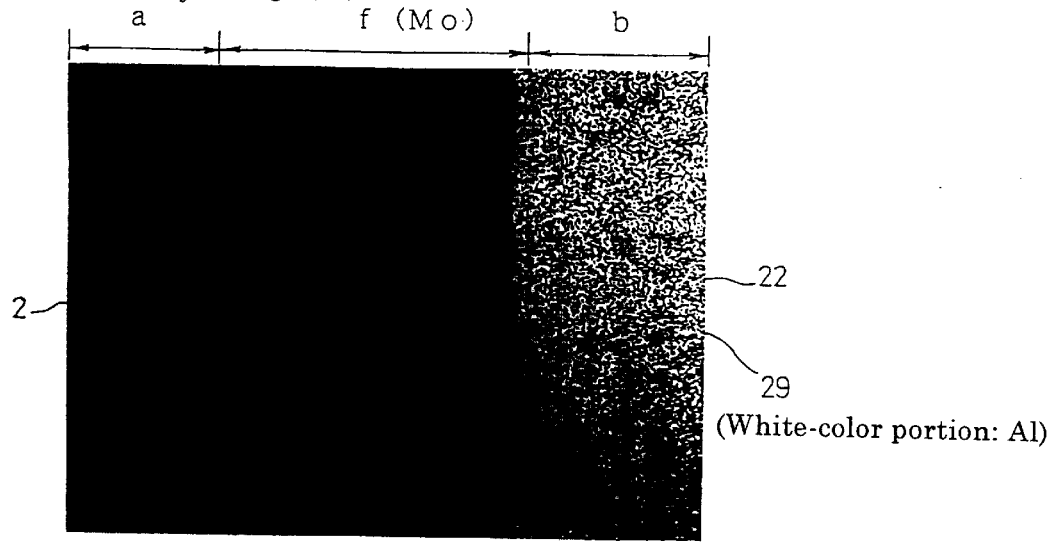
FIG. 28 is a photograph showing the characteristic X-rays image of the Al element distribution of the bonded portion of FIG. 22.
Figure 29:
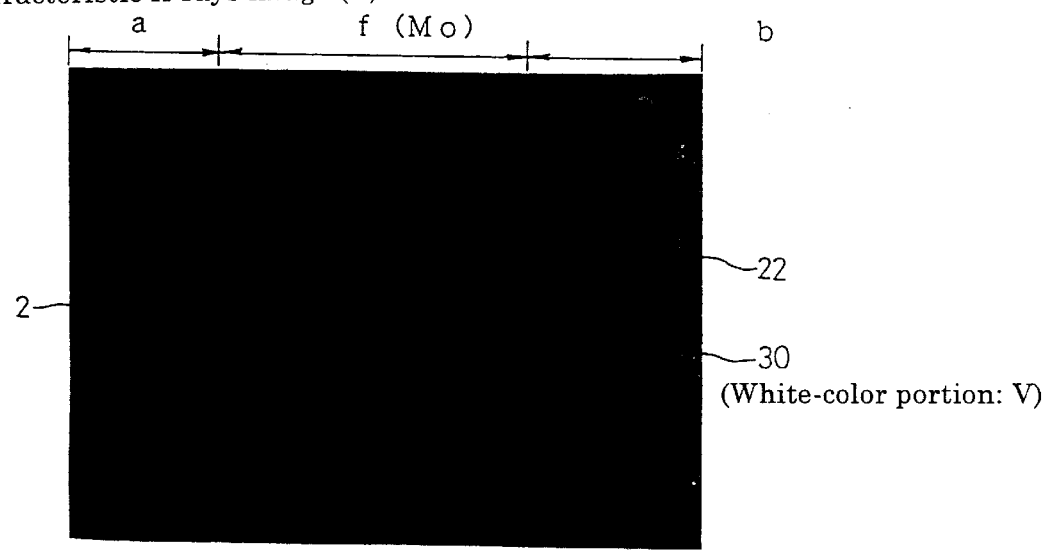
FIG. 29 is a photograph showing the characteristic X-rays image of the V element distribution of the bonded portion of FIG. 22.

FIG. 26 is the characteristic X-rays image of the Mo element distribution of the bonded portion, and a white standout portion 32 in the photograph is Mo detected by X-rays. FIG. 27 is a photograph showing the characteristic X-rays image of the Ti element distribution of the bonded portion, and a white standout portion 28 in the photograph is Ti detected by X-rays. FIG. 28 is the characteristic X-rays image of the Al element distribution of the bonded portion, and a white standout portion 29 in the photograph is Al detected by X-rays. FIG. 29 is the characteristic X-rays image of the V element distribution of the bonded portion, and a white standout portion 30 in the photograph is V detected by X-rays.

Figure 30:
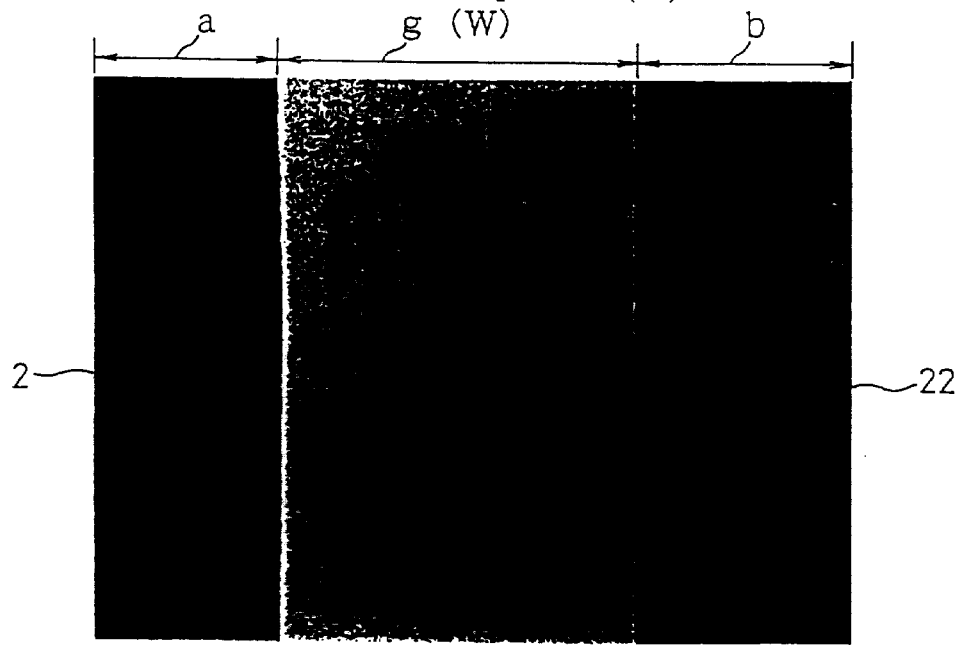
FIG. 30 is a photograph showing the secondary electron image of the bonded portion of rare-earth magnet and titanium alloy in case that W was used as an intermediate material.

FIG. 30 is a photograph showing the secondary electron image of the bonded portion of the magnet 2 and the titanium alloy 22 in case (Example 3) that tungsten (W) was used as an intermediate material, and a, b and g in the drawing respectively refer to a region of the magnet 2, a region of the titanium alloy 22, and a region of the intermediate member (W).

Figure 31:
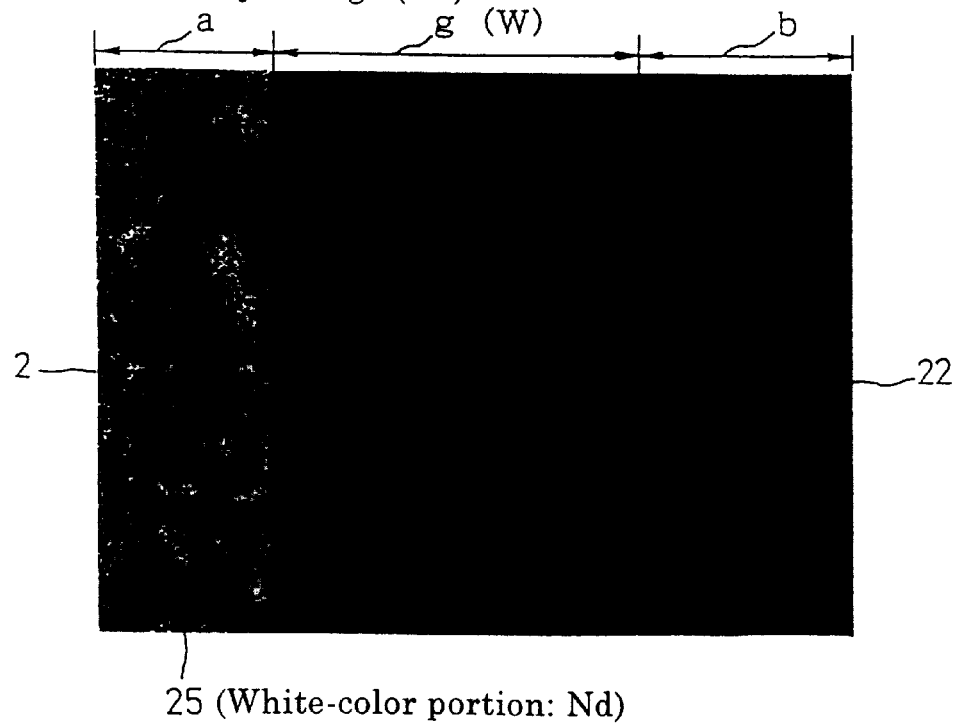
FIG. 31 is a photograph showing characteristic X-rays image where the Nd element distribution of the bonded portion of rare-earth magnet and titanium alloy of FIG. 30 was taken by EPMA.

FIG. 31 is a photograph showing the characteristic X-rays image where the Nd element distribution of the bonded portion of the magnet 2 and the titanium alloy 22 was taken by EPMA in case that W was used as an intermediate member, and a white standout portion 25 is Nd detected by X-rays. Regions of a, b and g correspond to those illustrated in FIG. 30.

Figure 32:
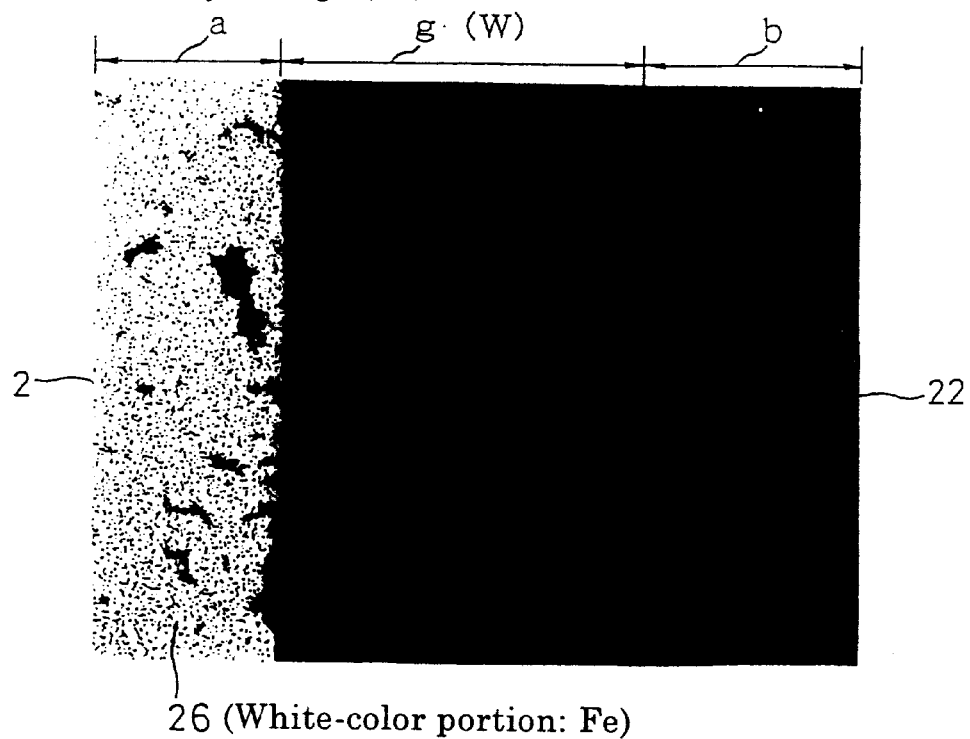
FIG. 32 is a photograph showing the characteristic X-rays image of the Fe element distribution of the bonded portion of FIG. 30.
Figure 33:
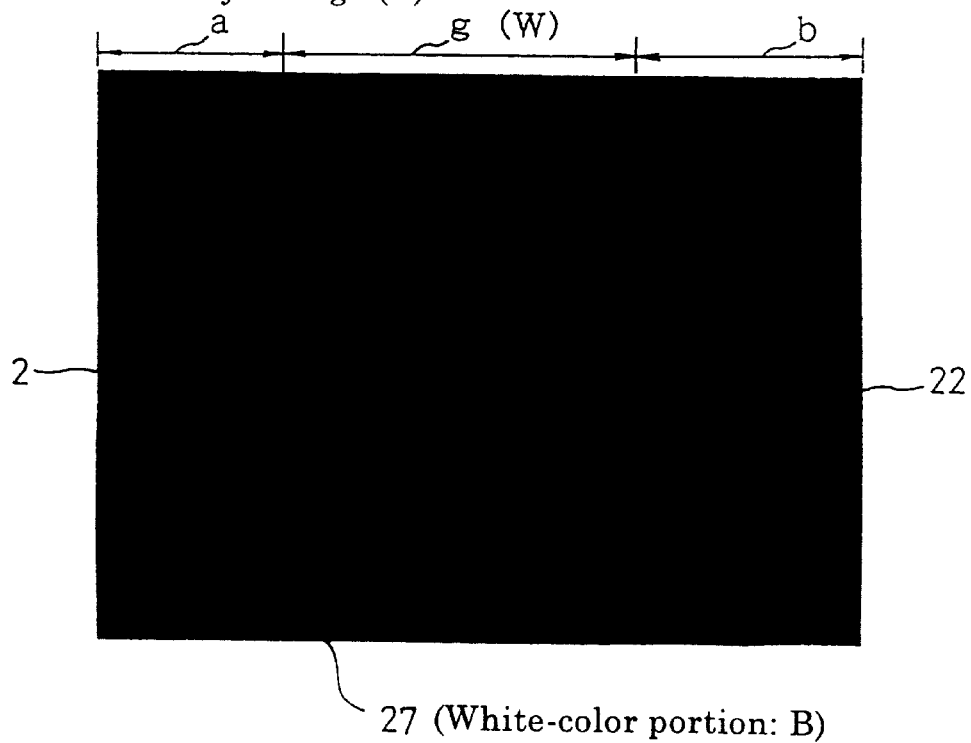
FIG. 33 is a photograph showing the characteristic X-rays image of the B element distribution of the bonded portion of FIG. 30.
Figure 34:
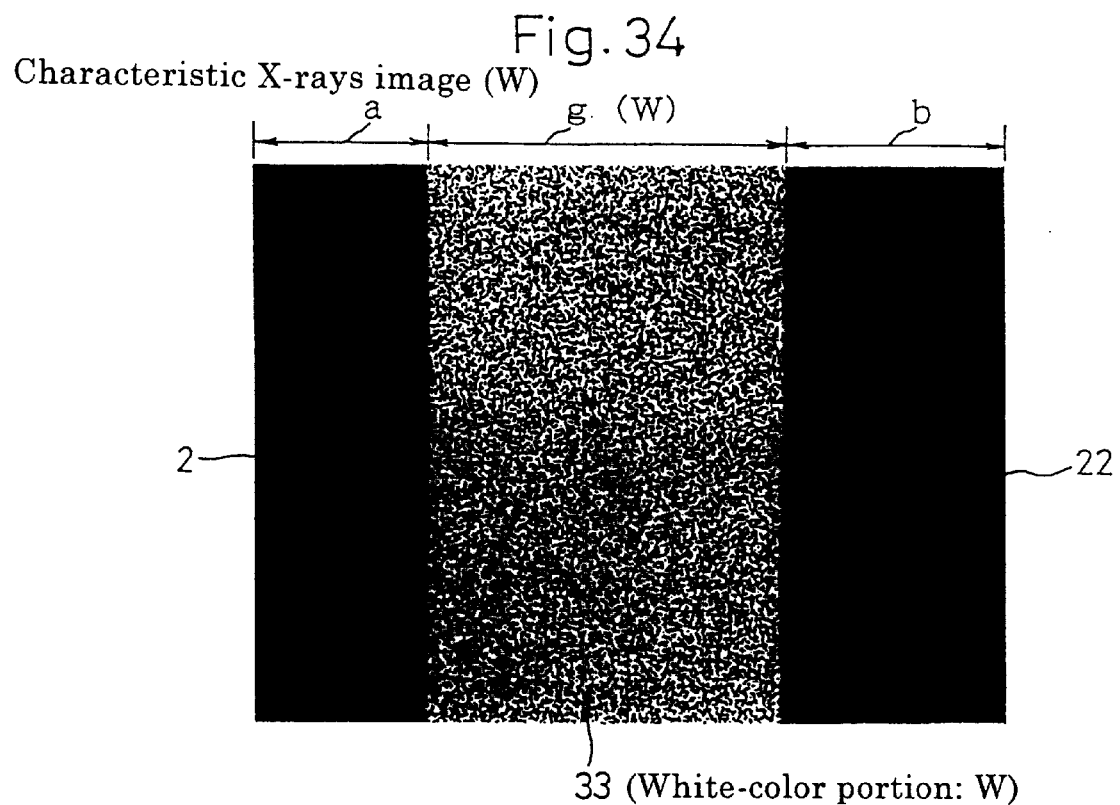
FIG. 34 is a photograph showing the characteristic X-rays image of the W element distribution of the bonded portion of FIG. 30.
Figure 35:
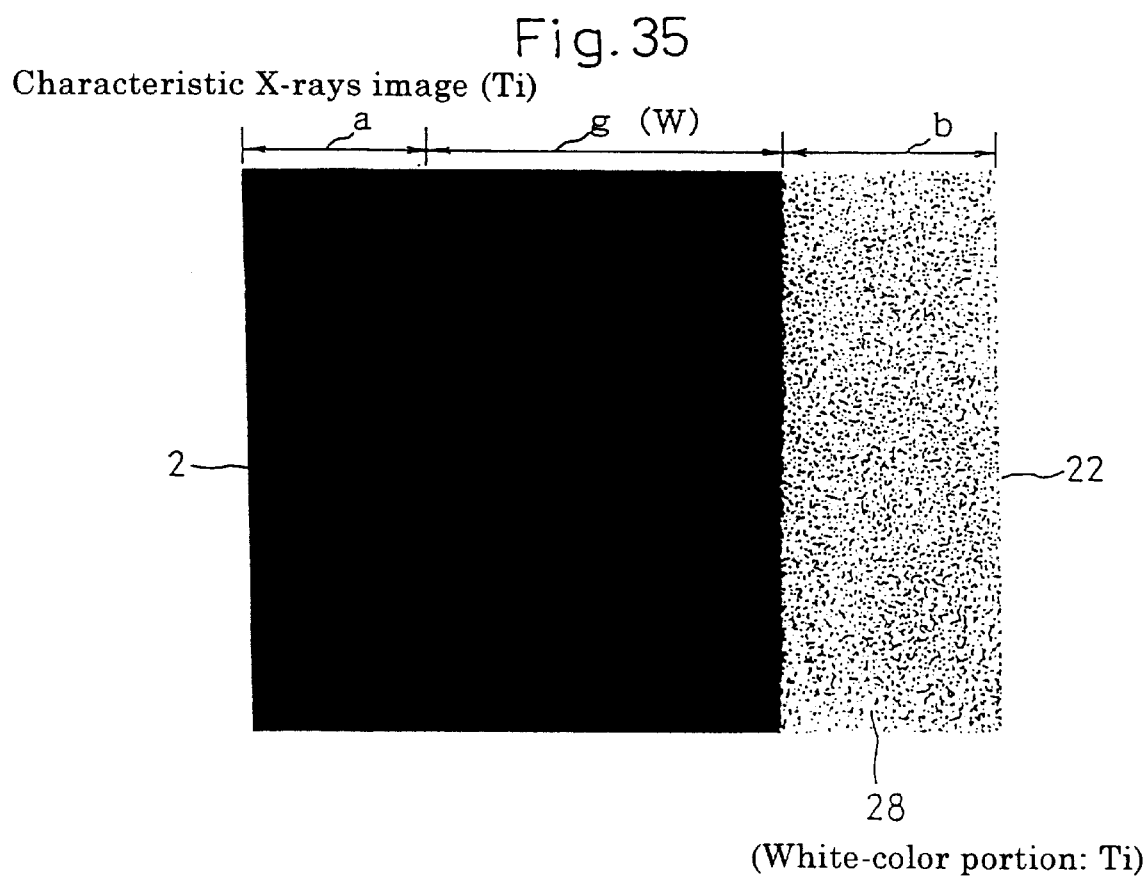
FIG. 35 is a photograph showing the characteristic X-rays image of the Ti element distribution of the bonded portion of FIG. 30.
Figure 36:
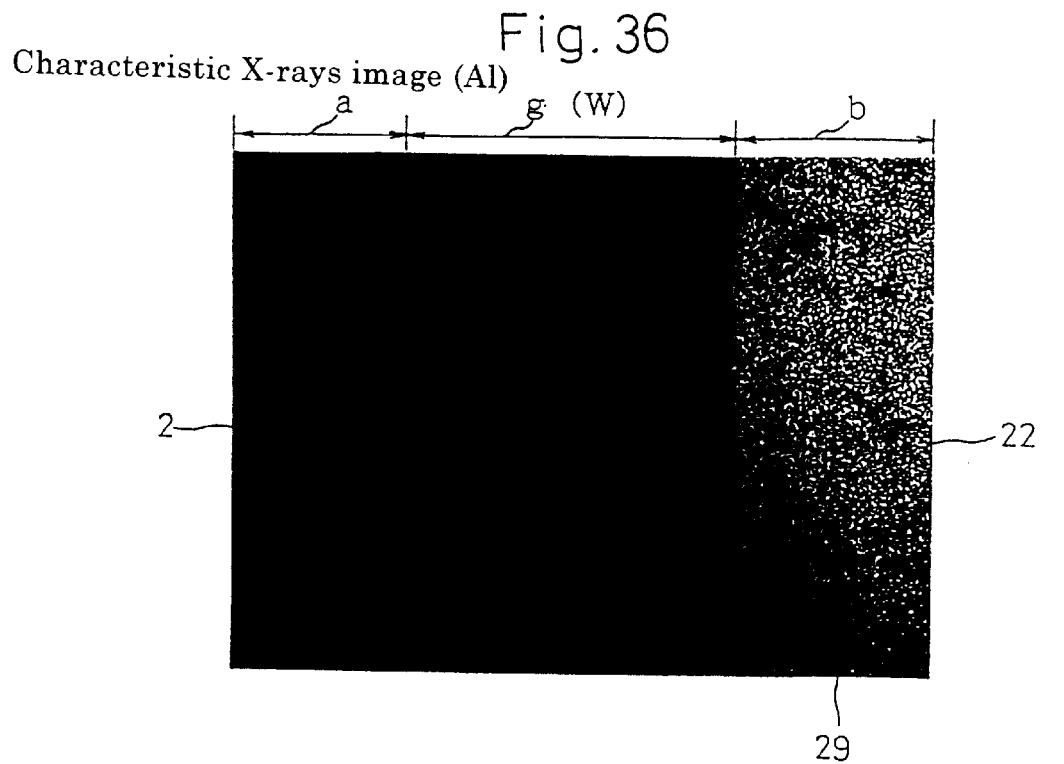
FIG. 36 is a photograph showing the characteristic X-rays image of the Al element distribution of the bonded portion of FIG. 30.
Figure 37:
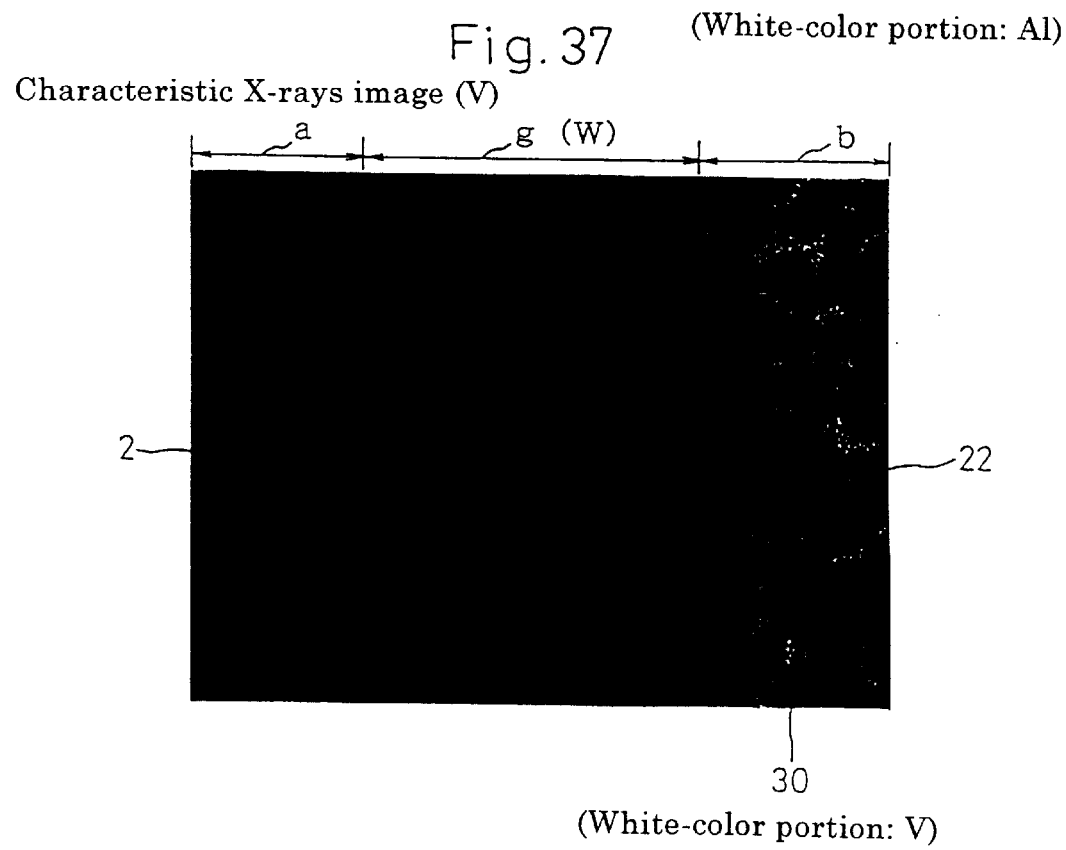
FIG. 37 is a photograph showing the characteristic X-rays image of the V element distribution of the bonded portion of FIG. 30.
Figure 38:
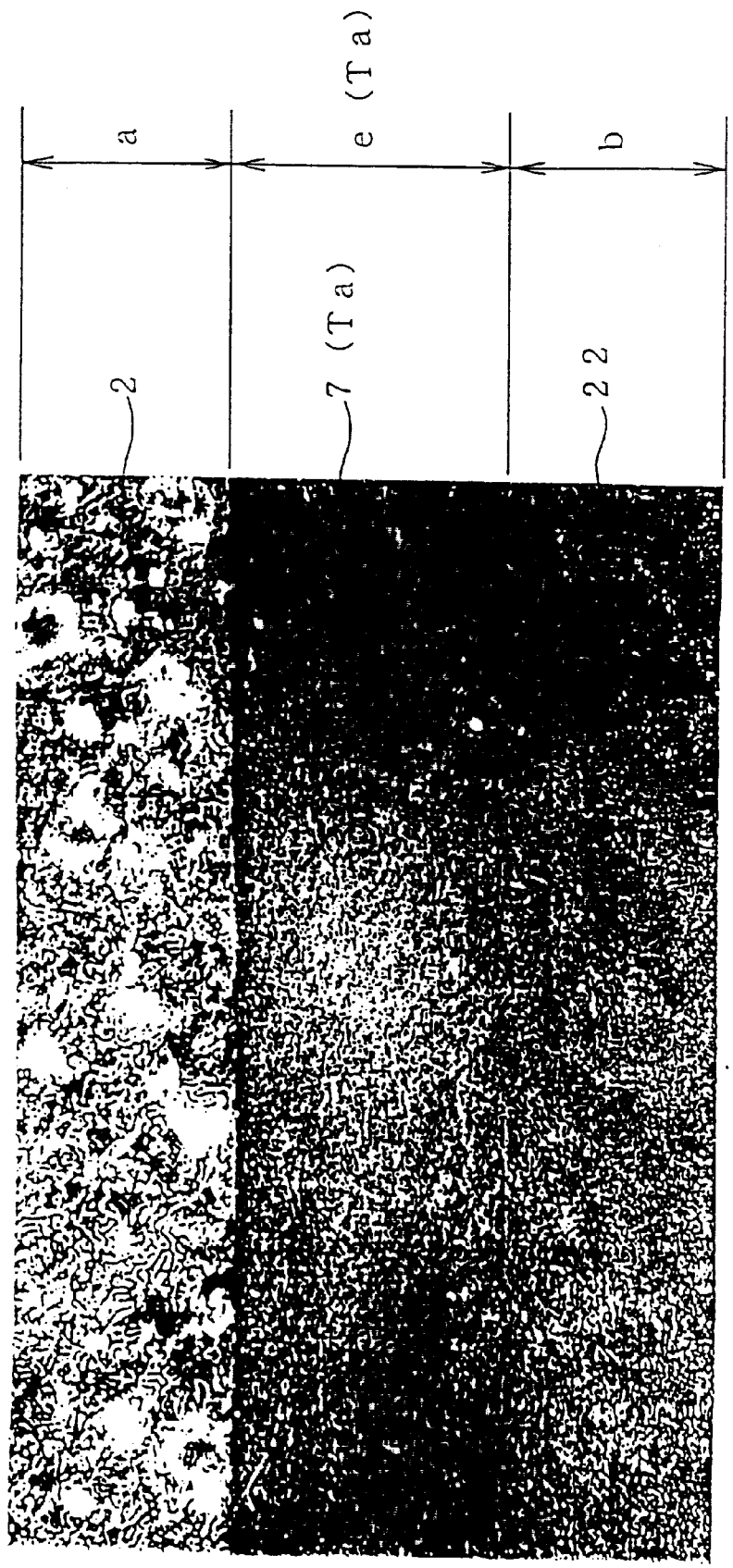
FIG. 38 is a photograph taken by a Kerr microscope, showing a metal texture in the vicinity of the bonding interface of Example (1).
Figure 39:
FIG. 39 is a photograph taken by a Kerr microscope, showing a metal texture in the vicinity of the bonding interface of Example (2).
Figure 40:
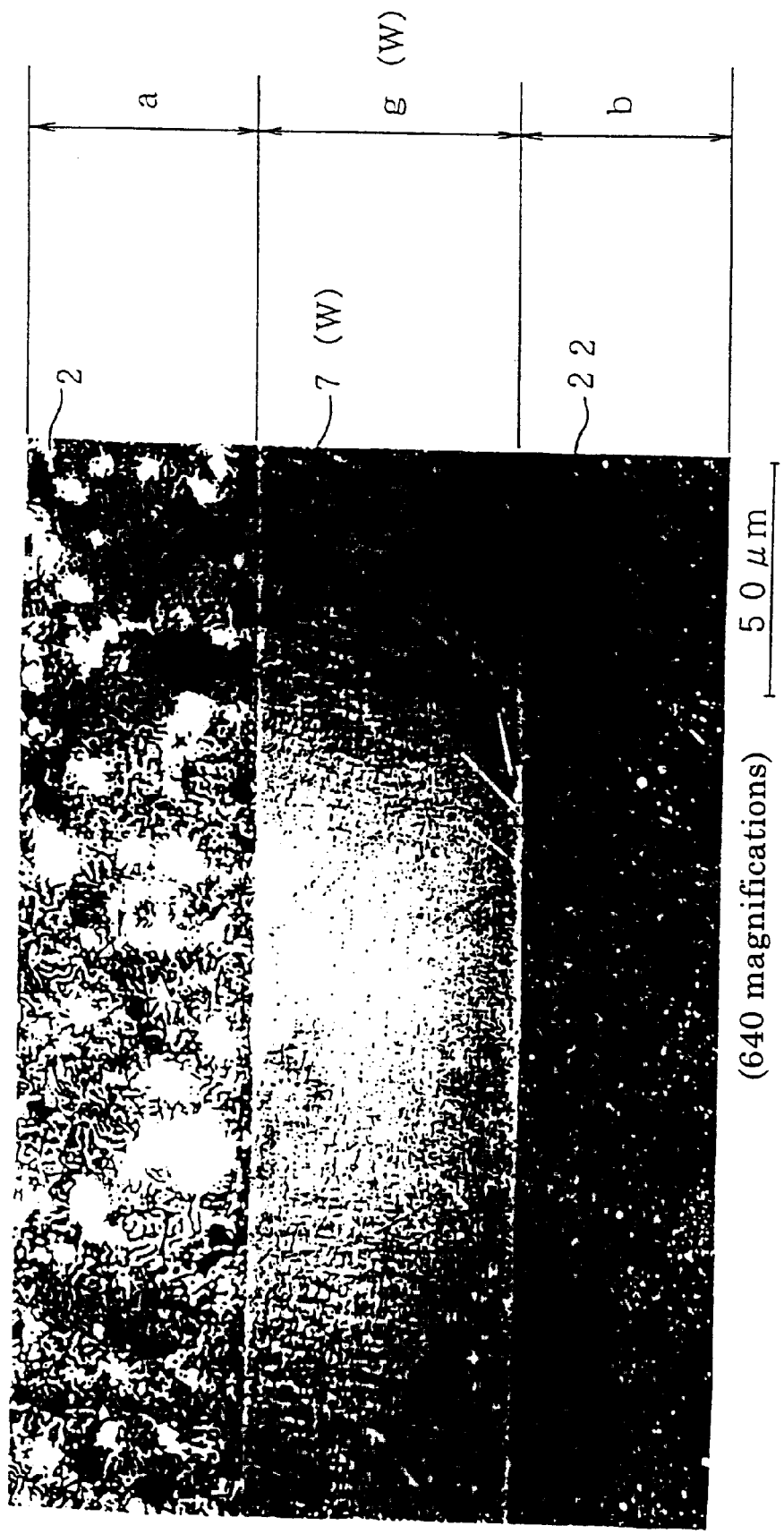
FIG. 40 is a photograph taken by a Kerr microscope, showing a metal texture in the vicinity of the bonding interface of Example (3).
Figure 41:
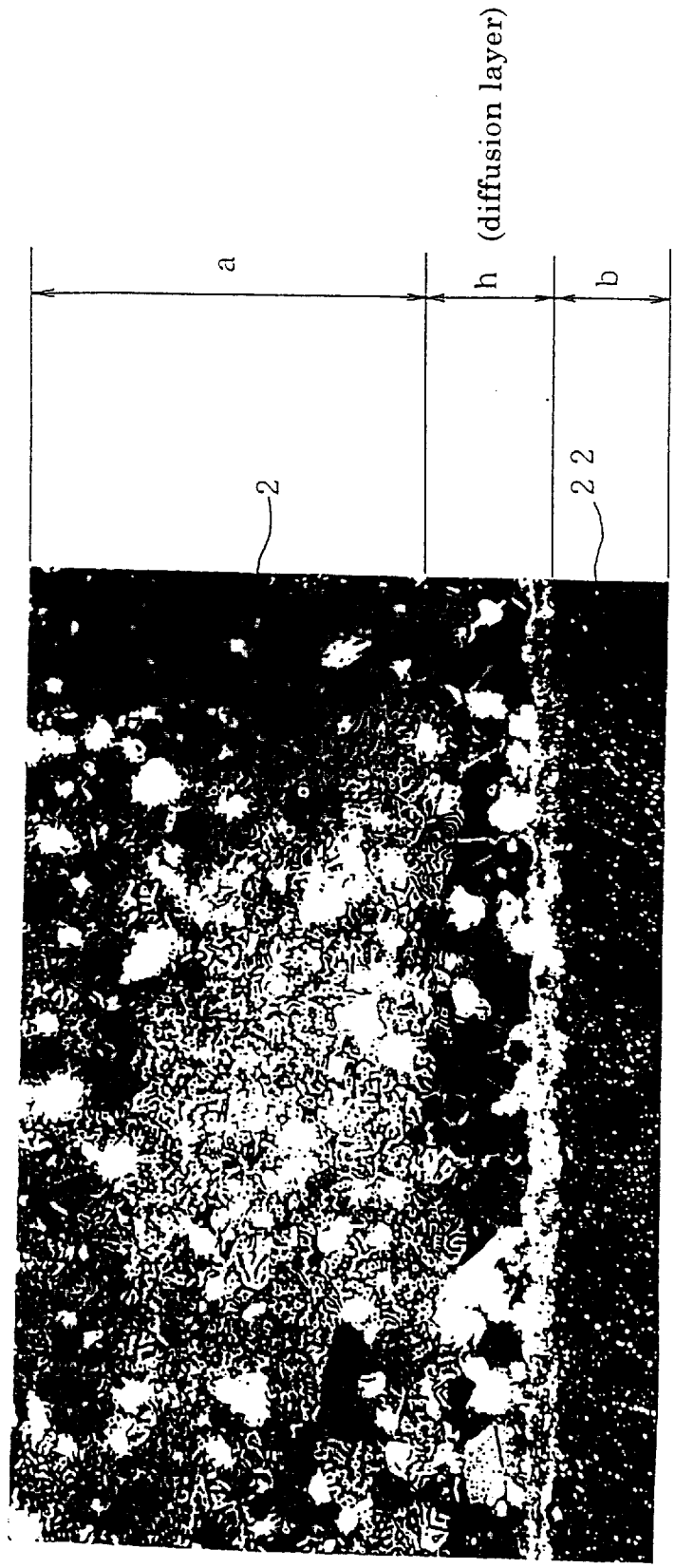
FIG. 41 is a photograph taken by a Kerr microscope, showing a metal texture in the vicinity of the bonding interface of Comparative Example (1).

In FIGS. 32–37, all of the intermediate members are tungsten (W). Similarly, FIG. 32 is the characteristic X-rays image of the Fe element distribution of the bonded portion, and a white standout portion 26 in the photograph is Fe detected by X-rays. FIG. 33 is the characteristic X-rays image of the B element distribution of the bonded portion, and a white standout portion 27 in the photograph is B detected by X-rays. FIG. 34 is the characteristic X-rays image of the W element distribution of the bonded portion, and a white standout portion 33 in the photograph is W detected by X-rays. FIG. 35 is the characteristic X-rays image of the Ti element distribution of the bonded portion, and a white standout portion 28 in the photograph is Ti detected by X-rays. FIG. 36 is the characteristic X-rays image of the Al element distribution of the bonded portion, and a white standout portion 29 in the photograph is Al detected by X-rays. FIG. 37 is the characteristic X-rays image of the V element distribution of the bonded portion, and a white standout portion 30 in the photograph is V detected by X-rays.

4. [Examination of the Results]

4-1 [HIP Bonded Member without Use of Intermediate Member]

The metal texture, hardness and the results of EPMA analysis of FIGS. 7–37 were examined. With this, an Nd-rich grain boundary phase ($Nd_{19}Fe$), a B-rich phase ($Nd_{11}Fe_4B_4$), a carbide phase ($Nd_2C_3$) and the like are distributed in a form of islands in the surrounding of crystal grains made of a main phase ($Nd_2Fe_{14}B$) of the magnet 2. The carbide phase is often adjacent to the grain boundary phase. This HIP bonded member without the use of the intermediate member 7 is assumed to be formed at the bonding interface with a reaction layer c (titanium bromide: containing very small amounts of Nd, Fe, V, Al and C) of several micrometers that is rich in Ti and B, as shown in FIGS. 10 and 11.

Furthermore, as shown in FIG. 9, the diffusion of Fe (a white-color portion in the photograph) from the side of the magnet 2 to the side of the titanium alloy 22 is remarkable. Furthermore, a dendrite texture, which is the titanium alloy's β phase dendritically grown from the bonded interface, is formed in the inside of the titanium alloy 22. Furthermore, Fe is an element for stabilizing titanium alloy's β phase. Furthermore, as shown in FIGS. 11, 12 and 13, Ti, Al and V are diffused from the side of the titanium alloy 22 to the side of the magnet 2, and in particular diffusion of Al is remarkable. The degree of diffusion is in an order of Al>Ti>V.

In the inside of the magnet in the vicinity of the bonding interface, the Nd-rich grain boundary phase, particularly the crystal grain boundary 3 stress portion or the carbide phase, decomposes, and supplies Fe, B and C by diffusion to the side of the titanium alloy, and this grain boundary phase becomes further Nd-rich. As a result, the activated Nd-rich portion corrodes the adjacent main phase portion to take main phase components of Fe, B and C. With this, it is assumed that the grain boundary phase 3 stress portion has grown greatly.

4-2 [HIP Bonded Member with Use of Ta as Intermediate Member]

As shown in FIG. 14, there is no reaction layer at an interface between tantalum (Ta) and the titanium alloy 22. However, Ta is diffused from the Ta side to the side of the titanium alloy 22, and the β phase of titanium alloy is grown dendritically from the bonding interface. Furthermore, Ta is an element for stabilizing the β phase of titanium alloy.

On the other hand, as shown in FIGS. 20 and 21, Al and V are diffused from the side of titanium alloy 22 to the Ta side. The degree of the diffusion is Al>V. Furthermore, as shown in FIGS. 15, 16 and 17, Nd, Fe and B are diffused in very small amounts at the interface between the magnet 2 and tantalum (Ta) from the side of magnet 2 to the tantalum (Ta) side. The degree of the diffusion is in an order of B>Fe>Nd. Furthermore, as shown in FIG. 18, Ta is diffused in a very small amount from the tantalum (Ta) side to the side of magnet 2, but the reaction layer was not formed. However, the inside of the magnet in the vicinity of the interface had a tendency to become Nd-rich.

4-3 [HIP Bonded Member with Use of Mo as Intermediate Member]

As shown in FIG. 22, there is almost no reaction layer at an interface between molybdenum (Mo) and the titanium alloy 22. However, Mo is diffused from the molybdenum (Mo) side to the titanium alloy side 22, and the β phase of titanium alloy is grown dendritically. On the other hand, as shown in FIGS. 28 and 29, Al and V are diffused from the side of the titanium alloy 22 to the molybdenum (Mo) side. The degree of the diffusion is Al>V.

At an interface between the magnet 2 and molybdenum (Mo), B, Fe and Nd (Fe and Nd are in very small amounts) are diffused from the side of magnet 2 to the molybdenum (Mo) side. However, the diffusion from the molybdenum (Mo) side to the side of magnet 2 barely occurred, and the reaction layer was not formed. However, the inside of the magnet 2 in the vicinity of the interface had a tendency to become Nd-rich.

4-4 [HIP Bonded Member with Use of W as Intermediate Member]

As shown in FIG. 30, there is almost no reaction layer at an interface between tungsten (W) and the titanium alloy 22. However, W is diffused in a very small amount from the tungsten (W) side to the titanium alloy side 22, and Al is diffused from the side of titanium ally 22 to the tungsten side (FIG. 36).

As shown in FIGS. 31 and 32, at an interface between the magnet 2 and tungsten (W), Nd and Fe are diffused in very small amounts from the side of magnet 2 to the tungsten (W) side and from the tungsten (W) side to the magnet side, but the reaction layer was not formed. However, the inside of the magnet in the vicinity of the interface had a tendency to become Nd-rich.

5. [Changes in Magnetic Characteristics of Magnet due to HIP Treatment]

In order to examine the changes in magnetic characteristics of magnet due to the HIP treatment, 10 pieces of Nd—Fe—B sintered magnet separate bodies, which had not been subjected to the HIP treatment, were assigned to Conventional Example and subjected to the measurement of magnetic characteristics, together with the above-mentioned Comparative Example (1) and Examples (1), (2) and (3) of the present invention.

Table 6 shows the results of the magnetic characteristics measurement of Examples (1), (2) and (3) and Comparative Example (1).

found in Comparative Example (1), as compared with Conventional Example.

FIG. 6 shows the results of the measurement of demagnetizing characteristics of magnet according to Example (2) in which a molybdenum thin sheet was used as an intermediate member, Comparative Example (1) and Conventional Example. As shown by circles of broken lines in the drawing, the demagnetizing characteristic curve of Comparative Example (1) becomes stepwise by the discontinuous decrease of the magnetization (4πI) at two positions of about 2 (kOe) and 15 (kOe) on the way of the demagnetizing field (H) to the coercive force (iHc), and thus is clearly different in appearance from the demagnetizing characteristics curve of Example (2) and Conventional Example. In case of a stepwise demagnetizing characteristics curve such as of Comparative Example (1), the self-demagnetization or heat demagnetization of magnet may be caused, and this is not preferable.

According to detailed data analysis, if the thickness of the diffusion layer formed between the magnet 2 and the intermediate member 7 is from 0.04 to 6%, based on the thickness of the magnet 2, the decrease of the magnetic characteristics is not found. In particular, in case of titanium alloy, the thickness of the diffusion layer is from 0.2 to 1.0%, and thus the magnetic characteristics were good.

Although not shown in the drawings, abnormality of the demagnetizing characteristics curve of such as Comparative Example (1) was not found in Examples (1) and (3).

6. [Results of Kerr Microscope Observation of Bonding Interface Subjected to HIP Treatment]

Then, the results showing textures in the vicinity of the bonding interface according to Examples (1), (2) and (3) and Comparative Example (1), which have been taken by a Kerr microscope, are shown in FIGS. 38–41. The photograph is of 640 magnifications.

From the Kerr microscope photographs and the above-mentioned EPMA analysis results of Examples (1), (2) and (3), it was found that tantalum (Ta), molybdenum (Mo) and tungsten (W), which were used as intermediate members 7, make a solid phase diffusion into the titanium alloy 22, and the β phase of the titanium alloy is grown dendritically. At an interface between the rare-earth magnet 2 and the intermediate member 7, B, Fe and Nd (Fe and B are in extremely small amounts) are diffused in small amounts from the side of the rare-earth magnet 2 to the side of the intermediate member 7, and the inside of the magnet in the vicinity of the

TABLE 6

|  | Intermediate Member | HIP Treatment | Br (kG) | bHc (kOe) | (BH)max (MGOe) | IHc (kOe) | Hk (kOe) | Hk/iHc |
|---|---|---|---|---|---|---|---|---|
| Examples | (1) Ta | Yes | 12.58 | 12.07 | 38.2 | 18.45 | 16.70 | 0.905 |
|  | (2) Mo | Yes | 12.53 | 12.28 | 38.7 | 18.02 | 17.64 | 0.979 |
|  | (3) W | Yes | 12.53 | 12.19 | 38.3 | 17.92 | 17.36 | 0.969 |
| Com. Ex. (1) | No | Yes | 12.51 | 11.26 | 34.3 | 17.22 | 11.33 | 0.658 |
| Conventional Example | No | No | 12.52 | 12.15 | 38.2 | 17.82 | 17.41 | 0.965 |
|  |  |  | 12.58 | 12.30 | 38.5 | 18.59 | 18.19 | 0.978 |

[Note] Magnet is Rare-earth Magnet.

Bonded another metal is titanium alloy (SAT64).

According to Table 6, the magnetic characteristics of Examples (1), (2) and (3) were almost equal to Conventional Example, and the reduction in magnetic characteristics due to HIP treatment was not found.

On the other hand, magnetic characteristics deterioration, particularly the reduction in bHc, (BH)max and Hk, was interface had a tendency to become Nd-rich. However, the formation of the reaction layer was almost not found. On the other hand, in case of Comparative Example (1) shown in FIG. 41, the growth of crystal grains in a region of about 15 μm on the side of the rare-earth magnet 2 of the bonding interface is found, and the magnetic domain pattern is not found. The crystal grains of these regions are clearly different from crystal grains of the rare-earth magnet 2. It was found by the above-mentioned EPMA photograph that a diffusion layer h prepared by diffusion of Ti from the side of the titanium alloy 22 is formed in crystal grains of this region.

Furthermore, a reaction layer of a region of about 5 µm, that is, an iron layer formed by diffusion from the side of the rare-earth magnet, is found on the side of the titanium alloy 22. Thus, it is considered that abnormality of the stepwise demagnetizing characteristics curve, which was explained by reference to FIG. 6, is caused by the formation of these reaction layers.

From the above-explained Kerr microscope observation results of the bonding interface, the reaction layer is a region of which metal texture can be identified by Kerr microscope and is a layer that is largely related to the bonding strength and magnetic characteristics. On the other hand, the diffusion layer is a region of which metal texture can not be identified by Kerr microscope and in which the existence of element(s) can be found only by conducting elemental analysis. The diffusion layer is a layer that is largely related to bonding strength.

7. [Relationships Between Bonding Strength of Rare-earth Magnet and Alloy Material by HIP Treatment, Diffusion Reaction Condition and Magnetic Characteristics]

In order to examine the validity of the HIP treatment, the bonding strength of the rare-earth magnet and the alloy material in case that the intermediate member was interposed therebetween and the bonding strength thereof in case that it was not interposed therebetween were determined, and the effects of the types of the intermediate member and the bonding temperature on this bonding strength were examined.

7-1 [Bonding Strength in Case that Rare-earth Magnet and Alloy Material were Directly Bonded Together]

Figure 42:
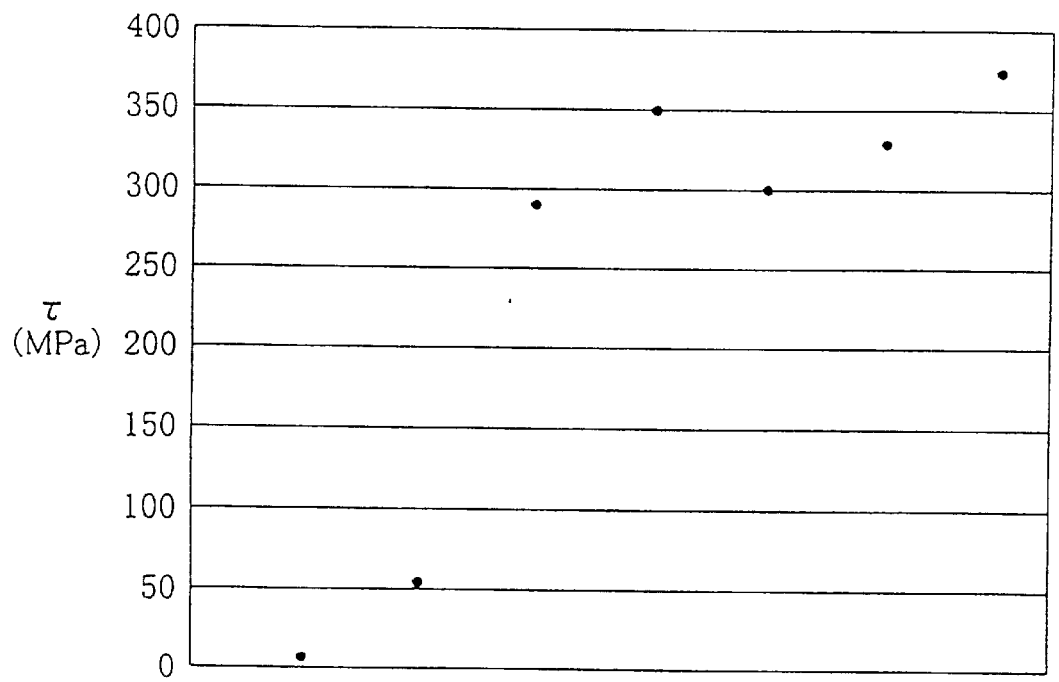
FIG. 42 is a graph in which the values of shear strength τ were plotted in case that a magnet and an alloy material were bonded together.

FIG. 42 is a graph in which the values of shear strength τ (MPa) measured with a shear test jig, after rare-earth magnets and various alloy materials were directly bonded together by changing the bonding method.

Carbon steels (SS400) as an alloy material were bonded in conventional manners with an epoxy bonding agent and a solder, a titanium alloy SAT64(Ti—6Al—4V) was subjected to HIP treatment under a temperature condition of 900° C., a superplastic titanium ally SP700 (Ti—4.5Al—3V—2Mo—2Fe) was subjected to HIP treatment by changing the temperature condition to 850 and 700° C. Furthermore, each of a low alloy steel (Fe—0.8Ni—1.8Cr—0.2Mo, SNCM439) and Inconel (52NI—19Cr—19Fe—3Mo, MA718) was subjected to HIP treatment under a temperature condition of 900° C.

According to FIG. 42, shear strength τ was about 14 (MPa) in case that the carbon steel was bonded by using an epoxy resin, and shear strength τ was about 60 (MPa) in case that the bonding was conducted by using solder. In contrast, shear strength τ was 290–370 (MPa) in case that magnets were bonded with a titanium alloy, a superplastic titanium alloy, a low alloy steel and Inconel by using HIP treatment, and thus the validity of HIP treatment to bonding strength was confirmed.

7-2 [Bonding Strength when Rare-earth Magnet and Alloy Material were Bonded Together with an Interposal of Intermediate Material]

Figure 43:
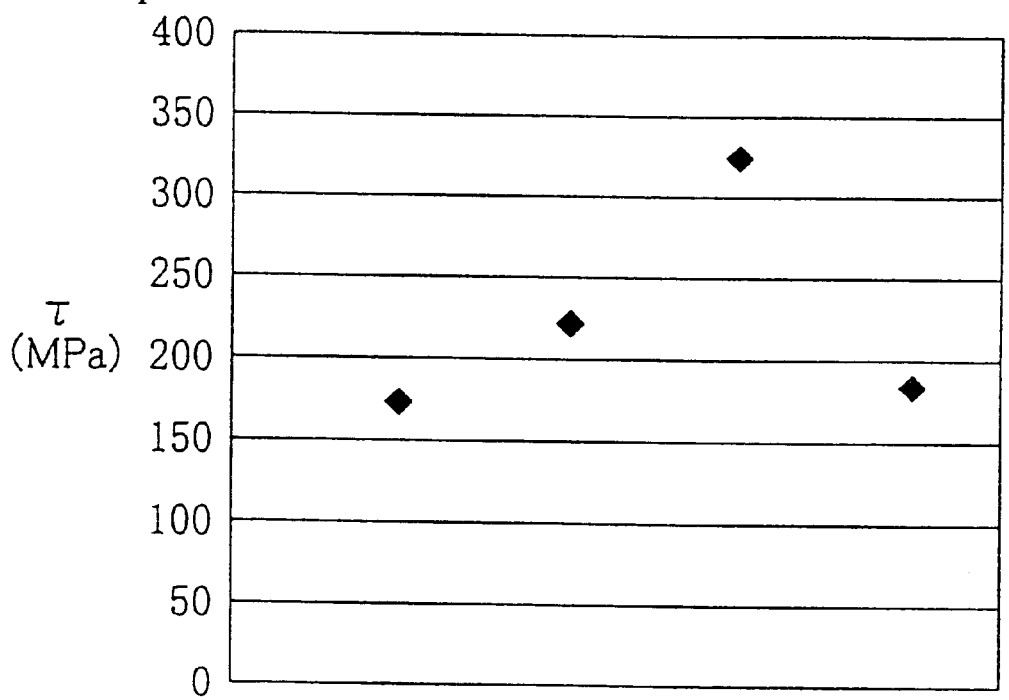
FIG. 43 is a graph in which the values of shear strength τ were plotted in case that a magnet and an alloy material were bonded together using Ta as an intermediate member.

FIG. 43 is a graph in which the values of shear strength τ (MPa), when rare-earth magnets and various alloy materials were bonded together by HIP treatment with an interposal of tantalum as an intermediate member, were plotted. The HIP treatment temperature of the alloy material and that was in the same condition as that of an example of FIG. 42.

According to FIG. 43, shear strength τ was in a range of 170–320 (MPa), and the validity of HIP treatment to bonding strength was confirmed, as compared with a conventional example in which an epoxy bonding agent or solder was used. In particular, bonding strength became the maximum when a superplastic titanium alloy (SP700) was used as an alloy material.

Figure 44:
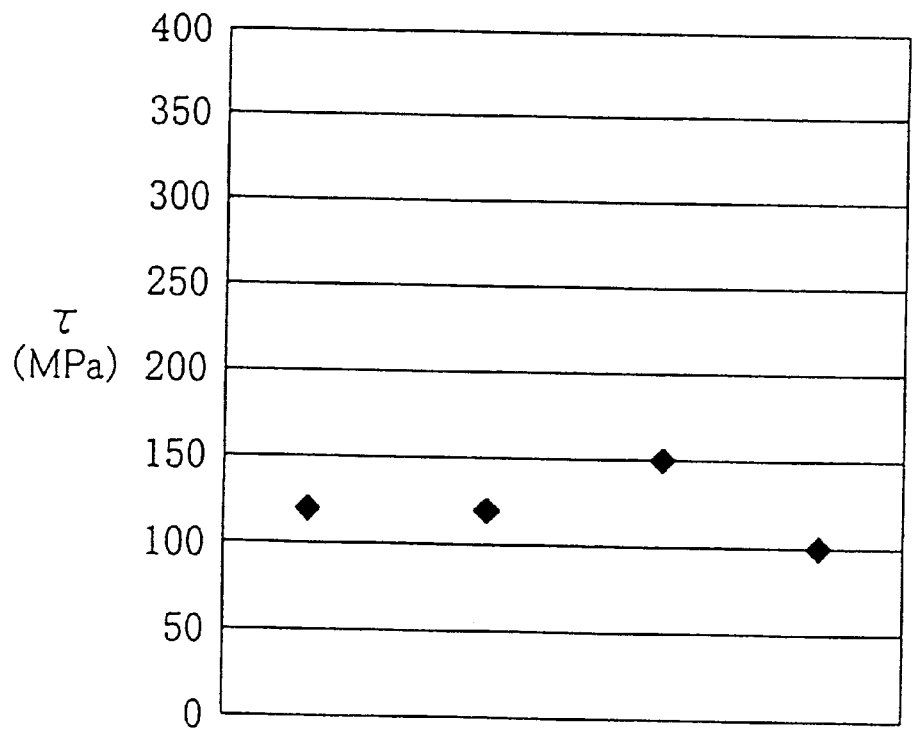
FIG. 44 is a graph in which the values of shear strength τ were plotted in case that a magnet and an alloy material were bonded together using Mo as an intermediate member.

FIG. 44 is a graph in which the values of shear strength τ (MPa), when rare-earth magnets and various alloy materials were bonded together by HIP treatment with an interposal of molybdenum as an intermediate member, were plotted. The HIP treatment temperature of the alloy material and that was in the same condition as that of an example of FIG. 43.

According to FIG. 44, shear strength τ was in a range of 100–150 (MPa), and the validity of HIP treatment to bonding strength was confirmed. Similar to the example of tantalum, bonding strength becomes the maximum when a superplastic titanium alloy was used as an alloy material.

7-3 [Diffusion Reaction Condition of Rare-earth Magnet and Alloy Material by HIP Treatment]

In order to examine validity of the HIP treatment, a superplastic titanium alloy (SP700) and Inconel (MA718) were selected as alloy materials to be bonded with rare-earth magnets, and the diffusion reaction conditions were respectively analyzed in cases that it was directly bonded with a rare-earth magnet and that an intermediate member was interposed. The results are shown in Tables 7 and 8.

TABLE 7

Diffusion Reaction Condition of Superplastic Titanium Alloy (SP700) and Rare-earth Magnet

| HIP Temp. | Intermediate Member | Diffusion Reaction Condition | |
|---|---|---|---|
| | | Superplastic Titanium Alloy Side | Rare-earth Magnet Side |
| 850° C. | Non | Reaction layer of Ti and B 0.2 µm. Fe of magnet is diffused 40 µm. | Diffusion of titanium alloy component is in a very small amount. |
| | Molybdenum | Diffusion does almost not occur. | Diffusion does almost not occur. |
| 700° C. | Non | Diffusion of magnet component is in an extremely small amount. | Diffusion of titanium alloy component is in an extremely small amount. |
| | Molybdenum | Diffusion does almost not occur. | Diffusion does almost not occur. |

TABLE 8

Diffusion Reaction Condition of Inconel (MA718) and Rare-earth Magnet

| HIP Temp. | Intermediate Member | Diffusion Reaction Condition | |
|---|---|---|---|
| | | Inconel Side | Magnet Side |
| 900° C. | Non | Nd, B, Dy and Co of magnet components are diffused. In particular, Nd is diffused in a large amount, and it forms a reaction layer together with Inconel component. | Ni of Inconel is diffused, and forms a Ni-Nd-Fe reaction layer and a Fe-Ni reaction layer mainly made of Fe. Diffusion of other Inconel components is in a very small amount. |

TABLE 8-continued

Diffusion Reaction Condition of Inconel (MA718) and Rare-earth Magnet

| HIP Temp. | Intermediate Member | Diffusion Reaction Condition | |
|---|---|---|---|
| | | Inconel Side | Magnet Side |
| | Molybdenum | Diffusion does almost not occur. | No diffusion between intermediate member and magnet occurs. |

According to Table 7, in case that a superplastic titanium alloy (SP700) and a rare-earth magnet were directly bonded together without an interposal of intermediate member, a reaction layer of titanium and boron is formed 0.2 $\mu$m on the side of the superplastic titanium alloy at a HIP treatment temperature of 850° C., and iron in the rare-earth magnet is diffused 40 $\mu$m. Furthermore, diffusion of the superplastic titanium alloy component on the side of the rare-earth magnet is in a very small amount. In case that molybdenum was interposed as an intermediate member, diffusion did almost not occur on both sides of the superplastic titanium alloy and the rare-earth magnet.

When the HIP treatment temperature was 700° C., diffusion did almost not occur on both sides of the superplastic titanium alloy and the rare-earth magnet or was, if any, in a very small amount, irrespective of whether or not an intermediate member is present.

According to Table 8, in case that an Inconel (MA718) and a rare-earth magnet were directly bonded together, Nd, B, Dy and Co of the rare-earth magnet components are diffused. In particular, Nd was diffused in a large amount, and it formed a reaction layer together with the Inconel. Furthermore, Ni of the Inconel was diffused on the rare-earth magnet side, and a Ni—Nd—Fe alloy layer and a Fe—Ni reaction layer mainly made of Fe were formed. Diffusion of other Inconel components is in a very small amount.

In case that molybdenum was interposed as an intermediate member, diffusion did almost no occur on both sides of the Inconel and the rare-earth magnet.

From the above results, in a bonding without an interposal of an intermediate member, it was found that a reaction layer tends to be formed between the rare-earth magnet and the alloy material in case that an alloy material to be bonded with a rare-earth magnet is a superplastic titanium alloy and that the HIP treatment temperature is 850° C. and in case that the alloy material is Inconel and found that diffusion hardly occurs in case that the alloy material is a superplastic titanium alloy and that the HIP treatment temperature is lowered to not higher than 700° C.

In a bonding with an interposal of an intermediate member, the mutual diffusion between the alloy material and the rare-earth magnet is suppressed.

7-4 [Magnetic Characteristics Caused by Bonding of Rare-earth Magnet and Titanium Alloy by HIP Treatment]

In order to examine validity of the HIP treatment, a superplastic titanium alloy (SP700) and Inconel (MA718) were selected as alloy materials to be bonded with rare-earth magnets, and the magnetic characteristics were respectively measured in case that it was directly bonded with a rare-earth magnet and that an intermediate member was interposed. In the measurement, a HIP-treated test sample was cut and ground and then magnetized with a magnetic field strength of 40 koe, and then the magnetic characteristics were found using a BH tracer. In the HIP treatment, the pressurization condition was 100 MPa, and the retaining time was 60 minutes. The results are shown in Tables 9 and 10.

TABLE 9

Magnetic Characteristics after HIP Treatment of SP700 (HIP Condition: 100 MPa, 60 min)

| Metal Cylinder Member Type | Intermediate Member Type | HIP Retaining Temp. (° C.) | Magnetic Characteristics | | | | |
|---|---|---|---|---|---|---|---|
| | | | Br (kG) | HcB (kOe) | (BH)max (MGOe) | HcJ (kOe) | Hk (kOe) |
| SP700 | Non | 700 | 12.64 | 12.16 | 39.3 | 17.53 | 16.44 |
| | | 820 | 12.50 | 12.08 | 37.9 | 16.90 | 16.27 |
| | | 850 | 12.58 | 12.16 | 38.5 | 18.58 | 17.06 |
| | Ta | 700 | 12.56 | 12.09 | 38.4 | 17.60 | 16.40 |
| | | 820 | 12.50 | 12.12 | 38.0 | 17.00 | 16.42 |
| | | 850 | 12.57 | 12.25 | 38.9 | 17.99 | 17.36 |
| | Mo | 700 | 12.33 | 12.07 | 37.5 | 17.66 | 17.07 |
| | | 820 | 12.52 | 12.10 | 37.9 | 16.84 | 15.88 |
| | | 850 | 12.54 | 12.27 | 38.8 | 18.25 | 17.65 |

TABLE 10

Magnetic Characteristics after HIP Treatment of Inconel (HIP Condition: 100 MPa, 90 min)

| Metal Cylinder Member Type | Intermediate Member Type | HIP Retaining Temp. (° C.) | Magnetic Characteristics | | | | |
|---|---|---|---|---|---|---|---|
| | | | Br (kG) | HcB (kOe) | (BH)max (MGOe) | HcJ (kOe) | Hk (kOe) |
| Inconel | Non | 900 | 12.55 | 9.32 | 30.2 | 16.55 | 4.86 |
| | | 1020 | 11.45 | 5.30 | 10.8 | 8.91 | 0.19 |
| | Ta | 900 | 12.65 | 12.09 | 39.0 | 16.48 | 15.96 |
| | | 1020 | 12.52 | 11.11 | 36.3 | 15.96 | 10.67 |
| | Mo | 900 | 12.72 | 12.14 | 39.2 | 16.76 | 16.23 |
| | | 1020 | 12.39 | 11.07 | 35.5 | 15.84 | 10.69 |

According to Table 9, it was found that there were almost no differences in magnetic characteristics in a HIP treatment temperature range of from 700 to 850° C. in case that the superplastic titanium alloy (SP700) and a rare-earth magnet are directly bonded together without an interposal of an intermediate member. In case that Ta or Mo was interposed as an intermediate member, the magnetic characteristics were very good.

From the above results, it was necessary to have an interposal of an intermediate member in case that the alloy material is a common titanium alloy SAT64 (Ti—6Al—4V), but it was found that good magnetic characteristics can be obtained in case that the alloy material is a superplastic titanium alloy SP700(Ti—4.5Al—3V—2—Mo—2Fe), even without an interposal of an intermediate member, and even if the bonding is conducted at a low temperature of 700–850° C.

According to Table 10, it was found that, in case that the alloy material is Inconel and that it is directly bonded with a rare-earth magnet, if a conventional HIP treatment temperature of 1020° C. is lowered to 900° C., HcJ and Hk are improved, but (BH)max becomes not higher than 80% of that of one that has not been subjected to HIP treatment and is not in the practical range.

7-5 [Relationships Between Diffusion Layer, Bonding Strength and Magnetic Characteristics by HIP Treatment]

Figure 45:
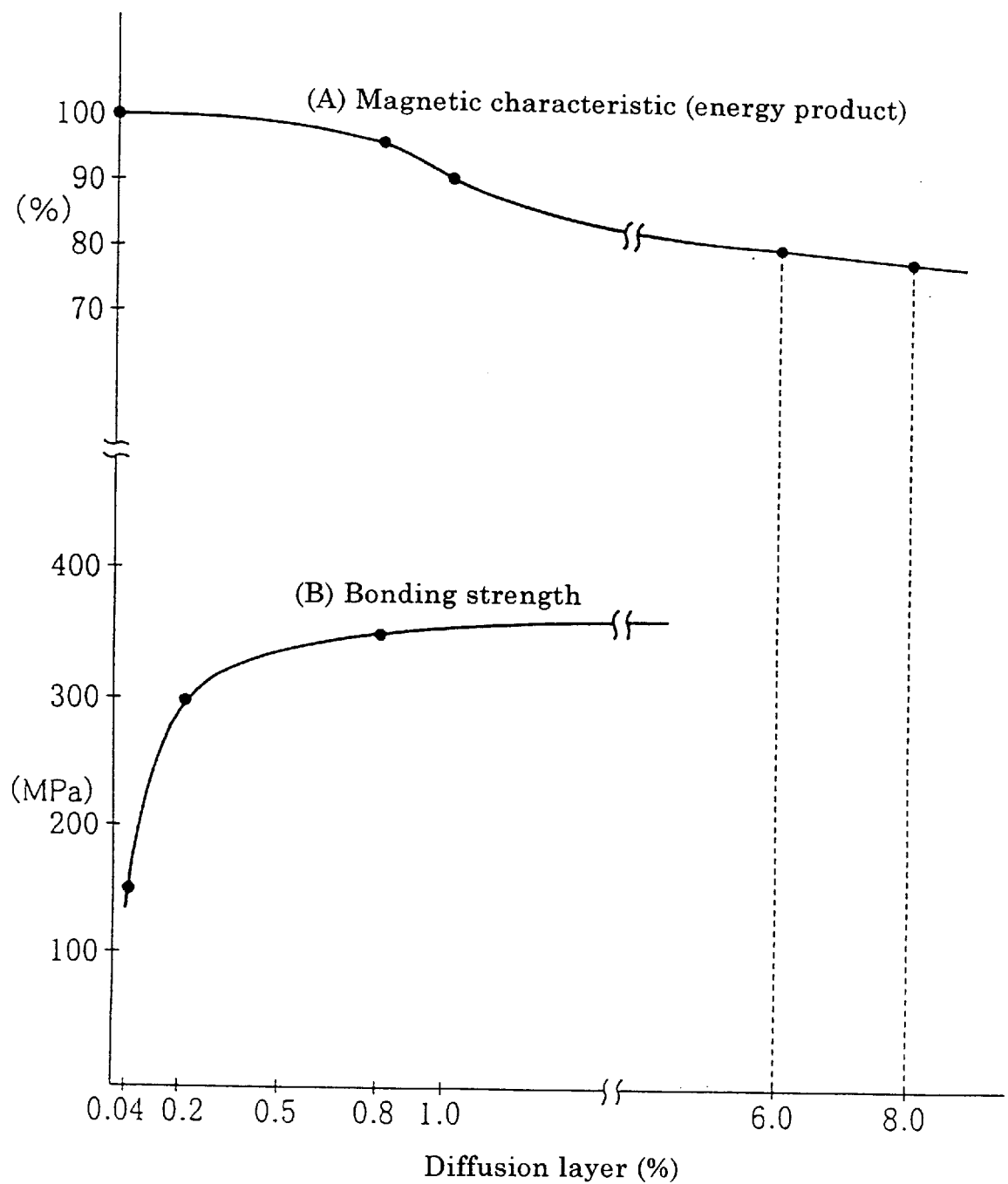
FIG. 45 is a graph in which the relationships between the thickness of the diffusion layer formed between the magnet and the alloy material and the bonding strength were plotted.
Figure 46A:
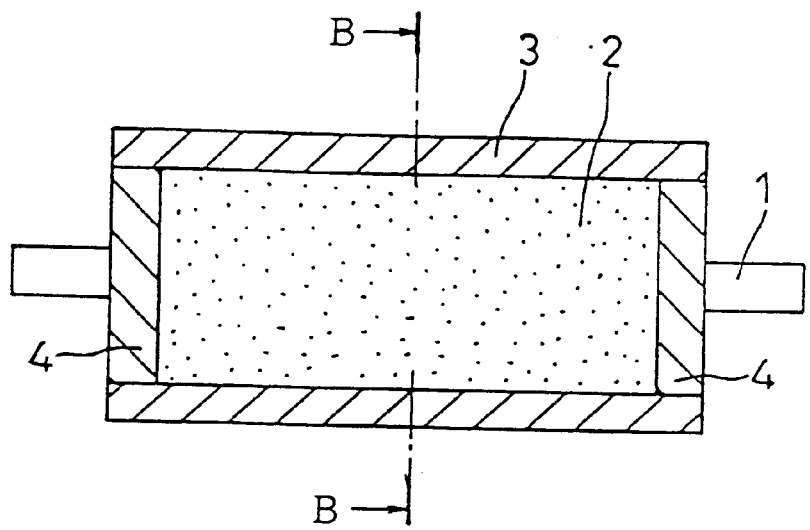
FIG. 46a is a sectional view of an essential part of a general structure of a rotor in which a conventional rare-earth magnet is used.
Figure 46B:
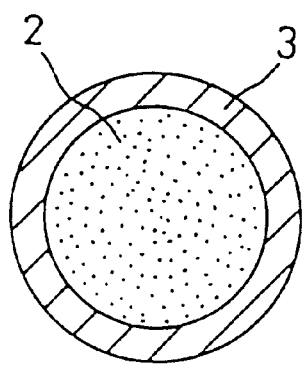
Figure 47A:
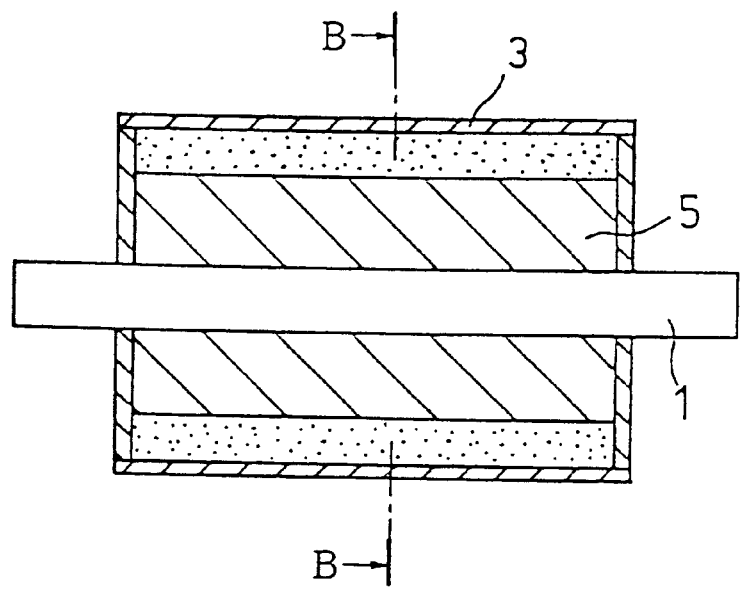
FIG. 47a is a sectional view of an essential part of a general structure of another rotor in which a conventional rare-earth magnet is used.
Figure 47B:
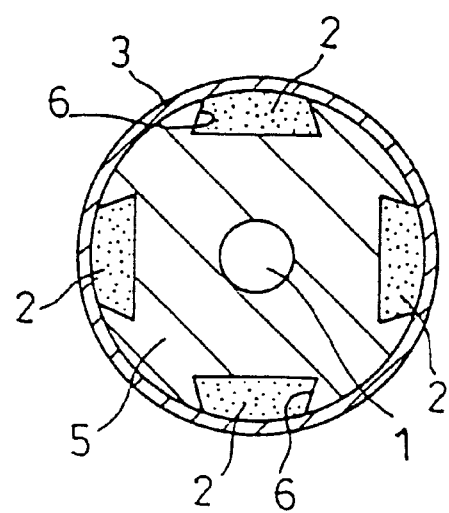

FIG. 45 is a graph in which the relationships between the thickness of the diffusion layer (the thickness of the diffusion layer, based on the thickness of the magnet, %) formed between the rare-earth magnet and the alloy material by HIP treatment and magnetic characteristics and the bonding strength were plotted. The graph(A) shows the thickness of the diffusion layer and the magnetic characteristic (energy product, %), and the graph (B) shows the thickness of the diffusion layer and the bonding strength (MPa). Furthermore, a common titanium alloy SAT64 was used as the alloy material.

According to FIG. 45, as the diffusion layer becomes larger, the magnetic characteristic lowers gradually. The thickness of the diffusion layer reached 6.0%, the magnetic characteristic lowered to 80%. It was found that the bonding strength increases steeply, when the diffusion layer is 0.2%, and then increases slightly.

From this result, both characteristics of the bonding strength and the magnetic characteristics become almost satisfactory by adjusting the thickness of the diffusion layer formed between the rare-earth magnet and the titanium alloy to be in a range of 0.04–6.0%, preferably 0.2–1.0%, based on the thickness of the rare-earth magnet.

8 [Discussion]

8-1 Case in which High Specific-tenacity Material is Titanium Alloy (SAT64 )

In case that a rare-earth magnet and a titanium alloy (SAT64 ) are directly bonded together by HIP treatment, bend was found in the demagnetizing curve, and $H_K$ value has decreased, and the maximum energy product (BH)max has slightly decreased. As a result of the texture observation with Kerr microscope, crystal grains do not have a magnetic pattern in a region that is about 10 $\mu$m away from the bonding interface toward the magnet, as is different from the main phase. Therefore, it is considered that the rectangular characteristic of the demagnetizing curve has moderated, since a low coercivity magnetic phase was formed in the vicinity of the bonding interface.

The value of iHc among the magnetic characteristics has slightly reduced to 1–1.5 kOe by conducting HIP treatment with an interposal of each intermediate member of Ta, Mo and W between a rare-earth magnet and a titanium alloy (SAT64 ). It is assumed that this was caused by heat history upon HIP treatment. As to such reduction, the characteristics can be improved by a recovery treatment of iHc by reheating and cooling.

In case that tantalum is used as an intermediate member, the Hk value lowers slightly more as compared with a case in which molybdenum and tungsten are used as intermediate members. This is considered to correspond to that tantalum tends to diffuse more than molybdenum and tungsten, into an Nd—Fe—B magnet.

From the viewpoint of preventing deterioration of magnetic characteristics, it is effective to dispose each of the above intermediate members between an Nd—Fe—B magnet and a titanium alloy. Of three types of the intermediate members, W and Mo are particularly good. On the other hand, in view of intermediate member's hardness, that is, the bonding characteristic based on deformative capability and mutual diffusion, molybdenum is the best.

The bonding strength lowers slightly with an interposal of an intermediate member, but is greater than the bonding strength due to a conventional epoxy bond. Thus, practical problems do not occur.

8-2 Case in which High Specific-tenacity Material is Inconel (MA718)

The bonding strength was higher in a case that a rare-earth magnet and Inconel (MA718) were directly bonded together by HIP treatment than that in a case that a titanium alloy and a superplastic titanium alloy were directly bonded together. On the other hand, the bonding strength in a case that the bonding was conducted with an interposal of an intermediate member was slightly lower than the bonding strength in a case that a titanium alloy and a superplastic titanium alloy were used. However, it is greater than the bonding strength due to a conventional epoxy bond, and thus practical problems do not occur.

As a summary of the above, it becomes possible to obtain a monolithically bonded construct of a rare-earth magnet and a metal material, which is superior in bonding strength and magnetic characteristics, by interposing a thin layer of high melting point metal as an intermediate member between a rare-earth magnet and a high specific-tenacity material upon bonding thereof, by adjusting the bonding temperature to 650–1100° C., and by conducting HIP treatment while it is retained for a constant time under a certain predetermined pressure.

Furthermore, in case that a rare-earth magnet and a high specific-tenacity material are directly bonded together without an interposal of an intermediate member, it becomes possible to obtain a monolithically bonded construct of a rare-earth magnet and a metal material, which is superior in bonding strength and magnetic characteristics, by adjusting the bonding temperature to 650–850° C., more preferably 700–800° C., and by conducting HIP treatment while it is retained for a constant time under a certain predetermined pressure. In particular, superplastic titanium alloy is preferable as a high specific-tenacity material.

According to a monolithically bonded construct of a rare-earth magnet and a metal material and a method for bonding them of the present invention, when a rare-earth magnet and a high specific-tenacity alloy material are bonded together, both characteristics of bonding strength and magnetic characteristics are well maintained. Therefore, diffusion of the high specific-tenacity alloy material toward the rare-earth magnet side is suppressed, and a reaction layer is formed on a bonding surface. Thus, it becomes possible to firmly monolithically bond a rotor member metal of such as rotor and a rare-earth magnet together without reducing the rare-earth magnet's inherent magnetic characteristics.

Therefore, even if centrifugal force, which acts on a rotor, increases further by the speedup or increase of capacity of electric machines and the like, it becomes to possible to eliminate a risk of having deformation or breakage of the rare-earth magnet.

According to the present invention, the above reaction layer is formed between the rare-earth magnet and the high specific-tenacity alloy material by interposing a high melting point metal as an intermediate member between the rare-earth magnet and the high specific-tenacity alloy material. Furthermore, voids are compressively broken, and thus it becomes possible to obtain a monolithically bonded member that has few bonding defects and a high strength and is compact, and to improve a rare-earth magnet itself, which is a brittle material in kind, with respect to strength and tenacity.

In particular, in case that a superplastic titanium alloy is used as the high specific-tenacity alloy material, both characteristics of bonding strength and magnetic characteristics are satisfied, and it can be bonded with a magnet without an interposal of an intermediate member, by adjusting the thickness of the diffusion layer formed between the rare-earth magnet and the superplastic titanium alloy to be in a range of 0.04–6.0%, preferably 0.2–1.0%, based on the thickness of the rare-earth magnet.

Furthermore, according to the present invention, the composite material of a rare-earth magnet and a high specific-tenacity alloy material is greatly improved in flexural strength, torsional strength, rigidity and corrosion resistance, and it becomes possible to provide the magnet side with compressive stress by using a metal that is larger than magnet in thermal expansion coefficient, based on the theory of shrinkage fit.

By using hot isostatic pressing treatment (HIP treatment) as a means for monolithically bonding a rare-earth magnet and a metal material, the solid phase diffusion bonding of a plurality of metal structural members, which constitute a rotor, can be conducted simultaneously by one treatment under a condition that the magnet is built in. Furthermore, upon the monolithic bonding where the magnet is built in, it becomes possible to build therein a naked magnet itself without having a coating film, since a rare-earth magnet is sealed in vacuum. Furthermore, even if the rotor is exposed to a high temperature for a long time by heat generation or the like in use, the magnet will not have deterioration caused by oxidation.

By conducting the above-mentioned HIP treatment, irrespective of whether or not an intermediate member is interposed, the bonding strength of the magnet and the alloy material increases remarkably, as compared with conventional bonding methods. In particular, if a superplastic titanium alloy is used as the alloy material, it becomes possible to maximize the bonding strength.

Diffusion of the titanium alloy component toward the magnet side is in a very small amount by HIP treatment, even if a superplastic titanium alloy is bonded at a low temperature of 650–850° C. without an interposal of an intermediate member. If an intermediate member is interposed, diffusion does almost not occur toward each of the titanium alloy and magnet sides. Therefore, it becomes possible to maintain the bonding strength thereof with the rare-earth magnet side, irrespective of whether or not an intermediate is present.

In particular, it provides a bonding structure and a bonding method that are capable of uniting a rare-earth magnet with another metal member to have a high strength, without deteriorating magnetic characteristics even at a high bonding temperature, such that the rare-earth magnet's insufficiency in strength, rigidity, tenacity and the like is compensated.

Industrial Applicability

As mentioned above, a monolithically bonded construct of a rare-earth magnet and a metal material according to the present invention is capable of enhancing the bonding property of a rotor member metal of such as electric machine and a rare-earth magnet. Therefore, it is useful to apply that to the production of a rotor used in a permanent magnetic high-speed generator or electrical machine. That is, however, not limited to such examples, but also can be used as a super high-speed spindle motor or a switchgear operation mechanical portion for an isolator portion of breaker and a direct current breaker, besides a compact high-speed generator using a gas turbine, a low inertia dynamo, a cogeneration generator, and the like.

Furthermore, as application fields for using a rare-earth magnet, it can be applied to the production of a flywheel electric power storing system, a watercraft, a chemical plant system, a fluid pump, a high-speed cutting machine, and the like.

What is claimed is:

1. A monolithically bonded construct of a rare-earth magnet and a metal material, comprising a rare-earth magnet and high melting point metal monolithically bonded together through solid phase diffusion bonding by a hot isostatic pressing treatment, wherein said high melting point metal is selected from the group consisting of tantalum (Ta), molybdenum (Mo), tungsten (W), vanadium (V), niobium (Nb), zirconium (Zr) and hafnium (Hf).

2. A monolithically bonded construct of a rare-earth magnet and a metal material, comprising a rare-earth magnet and a superplastic titanium alloy monolithically bonded together through solid phase diffusion bonding by a hot isostatic pressing treatment.

3. A monolithically bonded construct of a rare-earth magnet and a metal material, comprising a high melting point metal thin layer as an intermediate member interposed between a rare-earth magnet and an alloy material comprising a high specific-strength material, wherein said high melting point metal thin layer, said rare-earth magnet, and said alloy material are monolithically bonded together through solid phase diffusion bonding by a hot isostatic pressing treatment, and wherein said high melting point metal thin layer comprises a high melting point metal selected from the group consisting of tantalum (Ta), molybdenum (Mo), tungsten (W), vanadium (V), niobium (Nb), zirconium (Zr) and hafnium (Hf).

4. A monolithically bonded construct of a rare-earth magnet and a metal material according to claim 3, wherein said intermediate member has a thickness of from 2 to 200 $\mu$m.

5. A monolithically bonded construct of a rare-earth magnet and a metal material according to claim 3, wherein a thickness of a diffusion layer formed between a rare-earth magnet and an alloy material made of a high specific strength material is adjusted to be in a range of from 0.04 to 6.0%, based on thickness of said rare-earth magnet.

6. A monolithically bonded construct of a rare-earth magnet and a metal material according to claim 5, wherein said specific strength material comprises a superplastic titanium alloy, and wherein a thickness of a diffusion layer formed between said rare earth magnet and said superplastic titanium alloy is adjusted to be in the range from 0.2 to 1.0%, based on a thickness of said rare earth metal.

7. A monolithically bonded construct of a rare-earth magnet and a metal material according to claim 1, wherein said rare-earth magnet is the group consisting of selected from Nd—Fe—B magnets, Pr—Fe—B magnets, and Sm—Co magnets.

8. A monolithically bonded construct of a rare-earth magnet and a metal material according to claim 3, wherein an alloy material made of said high specific strength material is selected from the group consisting of titanium alloys, superplastic titanium alloys, nickel based alloys, high manganese steels, silicon steels, low carbon steels, low alloy steels, austenite stainless steels, ferrite stainless steels, martensite stainless steels, maraging steel, and Permalloy.

9. A method for monolithically bonding together a rare-earth magnet and a metal material, comprising:

bringing a rare-earth magnet and a high melting-point metal into contact with each other to form a laminate, placing said laminate into a hermetic, high pressure container having an inner wall portion equipped with a heater, subjecting said laminate to a hot isostatic pressing treatment in which said laminate is uniformly pressurized in all directions by a synergistic effect caused by pressure and temperature, while said laminate is maintained for a certain period of time under a certain pressure and temperature condition in an atmosphere of an inert gas, in order to monolithically bond said laminate, wherein said high melting point metal is selected from the group consisting of tantalum (Ta), molybdenum (Mo), tungsten (W), vanadium (V), niobium (Nb), zirconium (Zr) and hafnium (Hf).

10. A method for monolithically bonding together a rare-earth magnet and a metal material, comprising:

interposing a high melting point metal thin layer as an intermediate member between a rare-earth magnet and a high specific strength alloy material, thereby forming a laminate, placing said laminate into a hermetic, high pressure container having an inner wall portion equipped with a heater, subjecting said laminate to a hot isostatic pressing treatment in which said laminate is uniformly pressurized in all directions by a synergistic effect caused by pressure and temperature, while said laminate is maintained for a certain period of time under a certain pressure and temperature condition in an atmosphere of an inert gas, thereby to monolithically bond said laminate, and wherein said high melting point metal thin layer comprises a high melting point metal selected from the group consisting of tantalum (Ta), molybdenum (Mo), tungsten (W), vanadium (V), niobium (Nb), zirconium (Zr) and hafnium (Hf).

11. A method for monolithically bonding together a rare-earth magnet and a metal material according to claim 9, wherein bonding by said hot isotactic pressing treatment is conducted at 650–1,100° C. and 50–300 MPa for 0.5–10.0 hours.

12. A method for monolithically bonding together a rare-earth magnet and a metal material, comprising:

bringing a rare-earth magnet into contact with a superplastic titanium alloy to form a laminate, placing said laminate into a hermetic, high pressure container having an inner wall portion equipped with a heater, subjecting said laminate to a hot isostatic pressing treatment in which said laminate is uniformly pressurized in all directions by a synergistic effect caused by pressure and temperature in an atmosphere of an inert gas, at 650–850° C., 50–300 MPa for 0.5–10.0 hours, to monolithically bond said laminate.

13. A method for monolithically bonding together a rare-earth magnet and a metal material according to claim 9, wherein said rare-earth magnet is selected from the group consisting of Nd—Fe—B magnets, Pr—Fe—B magnets, and Sm—Co magnets.

14. A method for monolithically bonding together a rare-earth magnet and a metal material according to claim 10, wherein said high specific strength material is selected from the group consisting of titanium alloys, superplastic titanium alloys, nickel based alloys, high manganese steels, silicon steels, low carbon steels, low alloy steels, austenite stainless steels, ferrite stainless steels, martensite stainless steels, maraging steel, and Permalloy.

15. A monolithically bonded construct of a rare-earth magnet and a metal material according to claim 2, further comprising a diffusion layer formed between said rare-earth magnet and said superplastic titanium alloy, wherein said diffusion layer has a thickness in a range of from 0.2 to 1.0% based on a thickness of said rare-earth magnet.

16. A monolithically bonded construct of a rare-earth magnet and a metal material according to claim 2, wherein said rare-earth magnet is selected from the group consisting of Nd—Fe—B magnets, Pr—Fe—B magnets, and Sm—Co magnets.

17. A monolithically bonded construct of a rare-earth magnet and a metal material according to claim 3, wherein said rare-earth magnet is selected from the group consisting of Nd—Fe—B magnets, Pr—Fe—B magnets, and Sm—Co magnets.

18. A method for monolithically bonding together a rare-earth magnet and a metal material according to claim 10, wherein bonding by said hot isotactic pressing treatment is conducted at 650–1,100° C. and 50–300 MPa for 0.5–10.0 hours.

19. A method for monolithically bonding together a rare-earth magnet and a metal material according to claim 10, wherein said rare-earth magnet is selected from the group consisting of Nd—Fe—B magnets, Pr—Fe—B magnets, and Sm—Co magnets.

20. A method for monolithically bonding together a rare-earth magnet and a metal material according to claim 12, wherein said rare-earth magnet is selected from the group consisting of Nd—Fe—B magnets, Pr—Fe—B magnets, and Sm—Co magnets.

* * * * *